(12) United States Patent
Bergan

(10) Patent No.: US 11,355,997 B2
(45) Date of Patent: Jun. 7, 2022

(54) LARGE SCALE FLYWHEEL FOR ENERGY STORAGE

(71) Applicant: BERGAN TECHNOLOGY AS, Nesøya (NO)

(72) Inventor: Pål G. Bergan, Nesøya (NO)

(73) Assignee: BERGAN TECHNOLOGY AS, Nesøya (NO)

( * ) Notice: Subject to any disclaimer, the term of this patent is extended or adjusted under 35 U.S.C. 154(b) by 0 days.

(21) Appl. No.: 16/969,863

(22) PCT Filed: Feb. 15, 2018

(86) PCT No.: PCT/NO2018/050040
§ 371 (c)(1),
(2) Date: Aug. 13, 2020

(87) PCT Pub. No.: WO2019/160422
PCT Pub. Date: Aug. 22, 2019

(65) Prior Publication Data
US 2020/0403479 A1     Dec. 24, 2020

(51) Int. Cl.
*H02K 7/02*     (2006.01)
*F03G 3/08*     (2006.01)
(Continued)

(52) U.S. Cl.
CPC ............... *H02K 7/025* (2013.01); *F03G 3/08* (2013.01); *F16C 32/0696* (2013.01); *H02K 7/04* (2013.01); *H02K 7/085* (2013.01); *F16C 2361/55* (2013.01)

(58) Field of Classification Search
CPC ............ H02K 7/00; H02K 7/02; H02K 7/025; H02K 7/04; H02K 7/08; H02K 7/083;
(Continued)

(56) References Cited

U.S. PATENT DOCUMENTS

| 5,880,544 | A | * | 3/1999 | Ikeda | .................... | H02K 21/22 |
| | | | | | | 310/90 |
| 6,664,680 | B1 | | 12/2003 | Gabrys | | |

(Continued)

FOREIGN PATENT DOCUMENTS

| CN | 201543648 U | 8/2010 |
| CN | 103066741 A | 4/2013 |

(Continued)

OTHER PUBLICATIONS

Wilhelmsen Hodneland, John André; International Search Report; PCT/NO2018/050040; dated Sep. 11, 2018; 3 pages.

*Primary Examiner* — Tran N Nguyen
(74) *Attorney, Agent, or Firm* — Shackelford, Bowen, McKinley & Norton, LLP

(57) ABSTRACT

Flywheel for energy storage, comprising a rotor, a housing enclosure, means for charging energy by transferring electric energy to stored kinetic energy in the rotating rotor and means for discharging energy by transferring stored kinetic energy in the rotating rotor to electric energy, distinctive in that the rotor is vertically oriented, the rotor has mass of over 5000 kg, the rotor comprises a central vertical shaft, a radial bearing is arranged to an upper end of the vertical shaft, an axial-radial hydraulic bearing, or separate axial and radial bearings, is arranged to a lower end of the vertical shaft.

10 Claims, 9 Drawing Sheets

Figure 1:
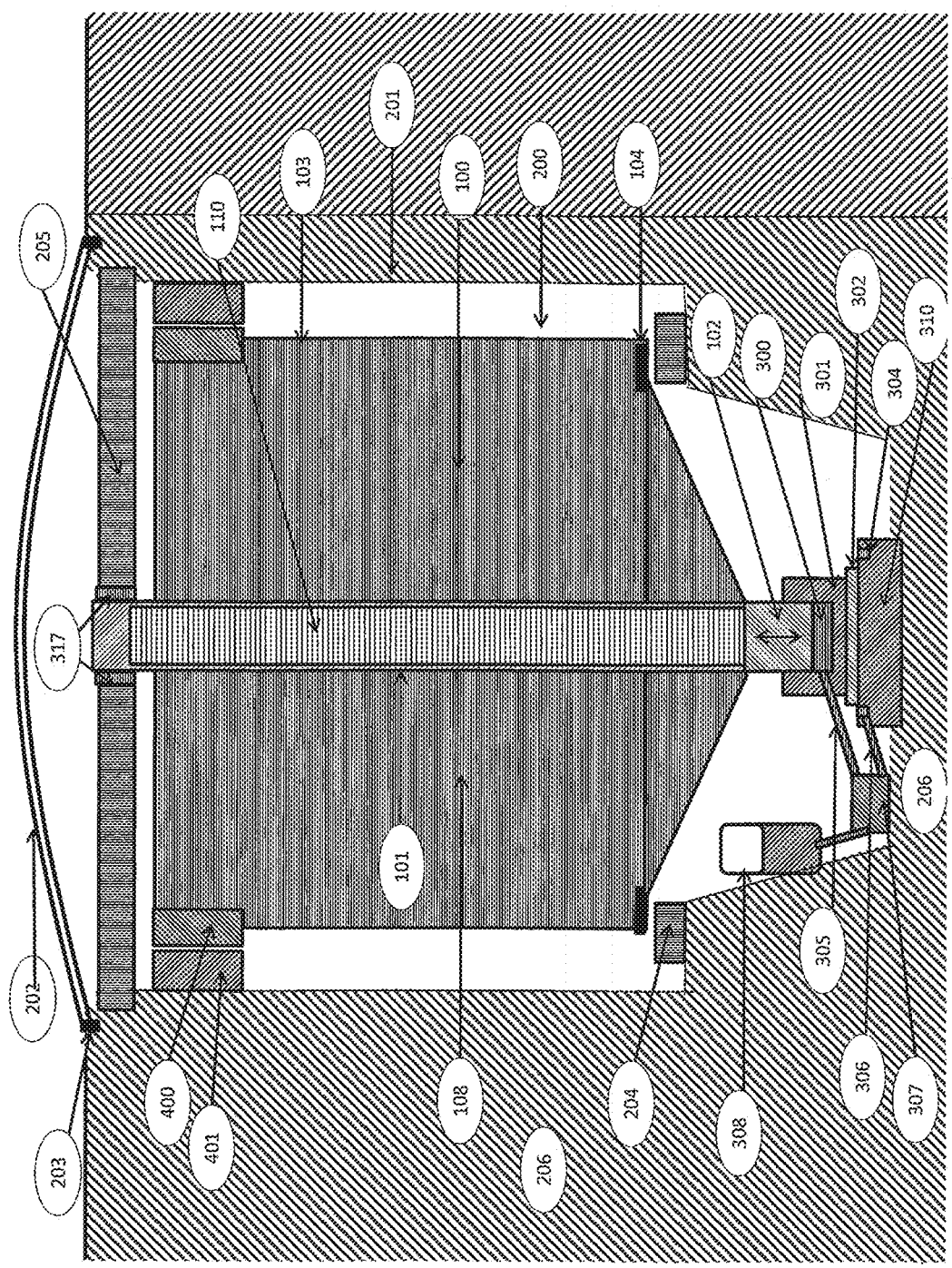

(51) Int. Cl.
*F16C 32/06* (2006.01)
*H02K 7/04* (2006.01)
*H02K 7/08* (2006.01)

(58) Field of Classification Search
CPC ............ H02K 7/085; H02K 7/09; H02K 7/18; H02K 7/183; F16F 15/30; F16F 15/31; F16F 15/315; F16F 15/3156; F03G 3/00; F03G 3/08; F16C 32/00; F16C 32/04; F16C 32/0408; F16C 32/042; F16C 32/0427; F16C 32/046; F16C 32/0465; F16C 32/047; F16C 32/0476; F16C 32/06; F03D 3/00; F03D 3/005; F03D 3/02; F03D 3/04; F03D 3/0427; F03D 9/00; F03D 9/007; F03D 9/11; F03D 9/12; F03D 9/25; F03D 9/255
See application file for complete search history.

(56) References Cited

U.S. PATENT DOCUMENTS

| | | | |
|---|---|---|---|
| 6,710,489 | B1 | 3/2004 | Gabrys |
| 8,134,264 | B2 | 3/2012 | Han et al. |
| 2011/0200436 | A1* | 8/2011 | Wu .................. F03D 15/10 |
| | | | 416/170 R |
| 2011/0298293 | A1 | 12/2011 | Veltri |
| 2012/0096984 | A1 | 4/2012 | Gray |
| 2016/0025067 | A1 | 1/2016 | Pristash |

FOREIGN PATENT DOCUMENTS

| | | | | |
|---|---|---|---|---|
| DE | 19856500 | * | 6/2000 | ............... F03D 9/12 |
| EP | 0055780 | A1 | 7/1982 | |
| EP | 1446860 | A1 | 8/2004 | |
| GB | 2491675 | A | 12/2012 | |
| WO | WO-03023942 | A1 | 3/2003 | |

* cited by examiner

LARGE SCALE FLYWHEEL FOR ENERGY STORAGE

FIELD OF INVENTION

The present invention relates to energy storages. More specifically, the invention relates to a storage in which the energy is stored in the form of rotary kinetic energy, a system for how to store and extract energy, and a method for building it, a method for how to operate it and replace wearing parts, and the overall use of the storage. The main components of the storage comprise a rotor, a support system for the rotor, electric motors and generators for input and output of electric power, and a hydraulic system that provides low friction support and enables construction, operation and repair of the system. All of this is contained in a chamber for which pressure and overall gaseous condition are controlled.

BACKGROUND OF INVENTION AND PRIOR ART

Flywheel type energy storages can be used for stabilizing frequency and current of electric power systems, for storing energy coming from such systems, and for delivering back electric power on demand.

The mechanics of flywheels has been known for hundreds of years and such devices are widely used mechanical stabilizing systems such as machines, gyros as well as for storing kinetic energy. As for energy storage, the ability to quickly accumulate and dispatch energy is in itself a desirable property. Additionally, a flywheel system may also include an electric power input which by electric motors is converted to a mechanical input which increases the energy stored. Likewise, the system can include electric generators for power output to be delivered for the desired applications. Further, when integrated with an electric grid the storage may also be used to stabilize frequency and voltage in such grid system and to bridge sudden gaps of power.

There are a series of challenges associated with flywheel energy storage. First of all, there is an unavoidable loss of energy due to friction between the rotor and support system as well as from the rotor to the surrounding atmosphere. Support conditions for the rotor thus represents a critical design element with regard to energy loss from friction. Another generic problem is imperfections in mass distribution and geometric misalignments which in turn can lead to vibrations and mechanical wear. Such unwanted performance is often referred to as "wobbling". Yet another problem is safety issues stemming from high centrifugal forces which can lead to that the rotor fails in an explosive manner and thereby releases high amounts of kinematic rotary energy and static elastic energy. As a consequence of the risk for rotor failure a flywheel is typically contained in a very strong, enclosing shell structure.

The rotor in a flywheel typically has a mass with an axisymmetric geometry built around a strong rotary axis. The kinetic energy stored in such a body is defined by $$E_k = \int_V e_k dV = \frac{1}{2}\omega^2 \int_V \rho r^2 dV \quad (1)$$

Here $e_k$ is kinetic energy per unit volume, $\omega$ is angular velocity, $\rho$ is mass density, and V indicates the entire volume of the rotating body. In the simplest case this may be a uniform cylinder rotating about a central axis. The energy stored in such a cylinder with external radius $R_e$ and height H may be expressed by:

$$E_k = \frac{1}{2}\omega^2 \int_0^{R_o} \rho r^2 dV = \pi\omega^2 H \int_0^{R_o} \rho r^3 dr = \frac{1}{4}\pi\rho\omega^2 H R_e^4 \quad (2)$$

A learning from this equation is that body radius and the angular frequency are the determining factor with regard to stored energy. Further, when energy is divided by total mass one will get the average energy content per unit mass (Nm/kg=Ws/kg):

$$\frac{E_k}{M} = \frac{1}{4}\omega^2 R_e^2 \quad (3)$$

When considering energy content, it is also crucial to take into account the amount of stressing that the rotating body is subjected to. The centrifugal force acting on rotating mass is given by $$f_c = \rho\ddot{u} = \rho\frac{dv}{dt} = \rho\frac{\omega r d\theta}{dt} = \rho\omega^2 r \quad (4)$$

Where t indicates time and $\theta$ is rotary angle. The strongest body force occurs at the largest radius $R_e$. Mechanically the centrifugal body force has to be counteracted by a combination of radial stress $\sigma_r$ and hoop (ring) stress $\sigma_\theta$. It is possible to establish a differential equation that, depending on particular materials and design, may be solved by way of analytical or numerical solution techniques. Here it suffices to point out that the outer fiber of the rotating body is stress-wise most critical since the radial stress boundary condition is $\sigma_r=0$ and the body force has to be taken solely by hoop stress which is given by $$\sigma_\theta = f_c R_e = \rho\omega^2 R_e^2 \quad (5)$$

When combining this equation with equation (3) it is seen that the energy density is governed by allowable stress $\sigma_a$ for outer fiber stress $\sigma_\theta$ divided by mass density $\rho$ $$\frac{E_k}{M} = k\frac{\sigma_a}{\rho} \quad (6)$$

This particular equation may be said to form the basis for flywheel developments up until now that has been dominated by search for a material strength with a highest possible strength $\sigma_a$ in relation to weight in order to attain the highest possible energy density. k is a corrective factor associated with the form of the rotating body. As seen from equations (3) and (5) k is ¼ for a compact cylinder.

Since the principle of flywheels are well known it is clear that most patents dealing with flywheels focus on resolving particular, problematic parts of the flywheel technology as mentioned above. This may for instance relate to a new type of support system that reduces the amount of friction. Belonging to this category, technologies have been developed during recent years that enable the rotor to "levitate" in a strong magnetic field. Further, much research and efforts has gone into developing materials with extremely high tension strength; representative developments for this is the use of high strength carbon fibers, graphene and nano-tubes. Needless to say, the total energy stored in a flywheel is also function of the square of the angular frequency as seen from equation (3), hence the implicit goal is to enable rotation with extremely high angular velocity (frequency). Unfortunately, high velocity flywheels made with materials with extreme strength properties correspondingly tend to be extraordinarily expensive.

There are a few examples of flywheel storage being implemented in electric grid settings. The world's largest flywheel installation is located in Stephenstown, USA where a "battery" of 200 flywheels produced by Beacon Energy can deliver 20 MW power on immediate demand. The primary purpose of this and other flywheel installations is to provide frequency and power regulation; their performance is thus primarily rated in effect (W) and not in terms of energy stored. Each unit has a high-performance rotor assembly that is sealed in a vacuum chamber and spins between 8,000 and 16,000 rotations per minute (rpm). At such speed vacuum is absolutely necessary to reduce friction. To reduce losses even further, the rotor is levitated with a combination of permanent magnets and an electromagnetic bearing. At 16,000 rpm ($\omega$=1700 radians per sec) each flywheel can in principle store and provide 25 kWh of extractable energy. This means that the total storage energy capacity of such a system is rather limited viewed in a grid scale energy setting.

Recently some combined "hybrid" installations of electric batteries and mechanical flywheels have been deployed.

Looking at the current state of the art it seems clear that flywheel technology has not yet been developed to a stage where it can fully serve as large scale energy storage. The path followed so far for commercial installations has been to operate a series of rather small flywheel based on the concept of high energy density and high-performance materials rather than a single, large flywheel. One exception to this is a relatively large, grid-connected flywheel that been set in operation in Ontario, Canada. In this case the rotor has been horizontally mounted and consists of compact, high strength steel. The power rating is 2 MW whereas main function is also in this case frequency regulation rather than providing reserve energy from storage. Power is transferred to the rotor by way of an electric motor that is also used as electric generator during discharge.

Examples of patents and patent applications relating to flywheels are EP 1446860 "Flywheel energy storage systems" where the flywheel and motor/generator system combination is designed to minimize bearing loads and thus increase system life, reliability and safety. Patent US 20110298293 "Flywheel energy system" focuses on a magnetic bearing assembly to carry part of the weight of the rotor and thereby supporting a significantly high portion of the weight of the flywheel. In U.S. Pat. No. 8,134,264 "Large capacity hollow-type flywheel energy storage device" the objective is to reduce the friction by a hollow shaft disposed in a vacuum chamber to be rotatable together with the flywheel. Patent CN 201543648 "Energy storage large flywheel device" relates to a specific use of flywheel used to stabilize production of seamless steel pipe and hence does not specifically relate to use of flywheels for energy storage. Patent CN 103066741 "Hundred-megawatt level heavy type flywheel energy storage system based on gas magnetic fluid float cylinder suspension" describes a flywheel with a fluid floater cylinder that is suspended on a combination of air cushion, magnetic suspension, and fluid float cylinder. The patent claims to have the possibility of 100 MW performance that is a measure of effect rather than energy stored, and rotor spinning velocity of up to 100000 rotations per minute (rpm). Needless to say, such rotational speed goes far beyond what any large rotor made of any type of material can sustain. Another case to mention is patent US 20120096984 A1 which specifically addresses the problem of stabilizing and mitigating wobbling of the rotor.

It is clear that none of the solutions described in prior art can provide a practical solution to very large scale energy storage when it is by "large scale" is meant that the energy stored is in order of MW hours and beyond. Certain traits are clearly common for all flywheel storages; they consist of a rotor mass connected to a rotor shaft, and they have devices for charging by electric motors and, reversely, discharging the energy in the form of electricity by way of electric generators. The latter may in fact be the same component as the motor operated in a reverse mode energy-wise. Clearly a main issue is to reduce loss of energy through friction within the support system and to the surrounding gas or atmosphere. A common and widely used approach is to reduce surface friction by providing vacuum conditions around the rotor. Further, use of magnetic levitation is commonly used to reduce friction in bearings. Unfortunately, magnetic levitation does not scale up for levitating very heavy rotor masses. The scale of size problem is also reflected in that much of the current development is focused on relatively small flywheels using high strength materials that can deliver high energy per mass unit during very high rotational frequency. For these reasons previous flywheel technology is primarily suited for delivering spurts of energy (large effect) for frequency and voltage regulation rather than for storing significant amounts of energy that can be time shifted for longer times for use when needed.

The current innovation takes on a diametrically different approach with the aim to enable storing as much total kinetic energy $E_k$ as possible in a single flywheel whereas the energy density as such may not be particularly high. Large scale or "grid scale" energy storage can thereby be obtained with a single or a limited number of flywheels. Rather than aiming for use of very expensive, high strength materials the present invention advocates using a very large rotor mass with inexpensive materials. Clearly such an approach brings with it a series of new problems that have to be resolved. One such problem is that the weight of the rotor may be so large that it cannot be prefabricated, transported and mounted on site. This means that the rotor has to be assembled and completed at site within the surrounding flywheel structure. Another challenge is to provide a new inventive step to minimize the friction associated with support and spinning of a very heavy rotor. Thirdly, it must be anticipated that it will be necessary to stop the rotor in a controlled way and replace supporting parts that are subjected to wear. Finally, mass balancing of the rotor to avoid instability and wobbling should be made possible. The quest is to find a way of doing all of this when the rotor may be too heavy to lift. Consequently, the invention also describes a complete solution for all of these combined problems.

Other parts of the energy storing technology relate to transfer of electric power to mechanical energy (electric motor) and back again to electricity during energy discharge. These issues can be implemented by way of methods and means that are readily available from current state of the art. Two main approaches are feasible, either by using the total flywheel rotor directly as a rotor for the electromagnetic motor and generator. Another approach is to have one or several separate motor-generator units that can be mechanically connected with the flywheel rotor.

SOME FEATURES OF AND CONSIDERATIONS FOR THE PRESENT INVENTION

The current invention provides a real and practical, novel solution to problems relating to very large energy storing flywheels. Moreover, the current innovation provides an entirely new role for flywheel storage that goes beyond frequency and voltage regulation. The objective of the invention is to be able to store, on a very large scale, electric energy from the electric grid or directly from electricity generating devices and return this energy with very high efficiency back as electricity. The size of the flywheel has beneficial effect on relative friction loss since stored energy is a function of radius to the fourth and the support friction associated with weight is a function of radius to the second for a spinning cylinder. Outer wall surface friction grows only linearly with the radius and thereby the surface area. Moreover, the surface friction depends on the surface velocity which is relatively low for the current invention compared with smaller flywheels with high performance materials and extremely high rotary speed RPM. All of this indicated that a large rotor system will have a much less relative frictional energy loss in the storage mode than that of a small, light rotor with very high speed.

The invention can be realized using only readily available and environmentally friendly materials. In this respect it provides major advantages over the most common way of storing electric energy, namely electric batteries which commonly uses both rare earth materials that are limited resources and materials such as Lithium and electrolytes that are problematic from safety and environmental point of view and difficult to recycle. The invention has also major practical advantages with respect to cost as compared with other energy storage solutions; it can be built almost anywhere provided there are acceptable ground conditions. It can be connected with major electric grid in an optimal way; this may be a large central storage or decentralized storages close to the source or to the users. Clearly, the invention enables better utilization and more reliable use of renewable energy sources such as wind farms and major solar power installations.

An important part of the current invention is that the weight of the rotor is fully carried by a piston that is resting on a hydraulic fluid. Such fluid will in most cases be a type of oil which will be an incompressible, Newtonian fluid. By Newtonian fluid is meant a fluid for which the viscosity is not influenced by the pressure and the viscos shear stress $\tau$ is defined by the Newtonian equation $$\tau = \mu \frac{\partial v}{\partial y} \quad (7)$$

where the shear stress $\tau$ is proportional to the dynamic viscosity $\mu$ and the gradient of the velocity v in direction y. Clearly the shear stress occurs in the plane perpendicular to direction y.

The Newtonian equation forms the basis for determining the so-called skin friction drag which customarily is found by $$\tau_s = C_f \frac{\rho v^2}{2} \quad (8)$$

where $C_f$ is the skin friction coefficient which inversely depends on the square root of the Reynolds number $R_e$. $R_e$ in turn depends on the surface velocity, geometry and the kinematic viscosity of the fluid. The kinematic viscosity is similar to the dynamic viscosity while being divided by the mass density. The physics here is an important basis for the current invention because it determines the frictional loss between the rotor piston and the fluid on which it rests. Since the rotor is large and it has a relatively slow angular velocity $\omega$ the rotational velocity at the contact surface of the piston will be very low. Note also that the rotational velocity at the fluid contact surface is directly proportional to the radial distance r from the rotor axis. This means that there is virtually no friction near the axis; even at the outer rim of the piston the friction will be very low since the piston has a much smaller diameter that the rotor. Most of all, there is no effect on friction from pressure the surface friction. Notably this is very different from so-called dry friction (Coulomb friction) where the frictional force is directly proportional to the to the contact pressure.

A further comment is that the hydraulic fluid should be chosen on the basis of optimal viscosity and wear resistance. By optimal viscosity is meant that there is a balance between, on one hand, reducing friction by having low viscosity and, on the other, reducing leakage from the piston chamber by having a higher viscosity.

There is one further issue to be mentioned for very large flywheels, and that is the consideration of forces associated with directional change of the very large rotary momentum of the spinning rotor (vector quantity). To some extent a large flywheel may be considered being a large gyroscope that is forced to change the direction of its axis of rotation along with the movement of the local surface where it placed. This 24-hour rotational cycle of the Earth gives rise to moment that is exerted upon the rotational axis through the upper and lower mechanical supports. This forcing moment, which is related to the so-called "Coriolis force", can be calculated on the basis of location on the Earth's surface, and moment of inertia and angular velocity of the rotor. From this calculation the associated, laterally acting contact forces on the axis and possible wear conditions can be designed for.

SUMMARY OF THE INVENTION

The present invention provides a flywheel for energy storage, comprising a rotor, a housing enclosure, means for charging energy by transferring electric energy to stored kinetic energy in the rotating rotor and means for discharging energy by transferring stored kinetic energy in the rotating rotor to electric energy.

The flywheel is distinguished in that:
the rotor is vertically oriented,
the rotor has mass of over 5000 kg,
the rotor comprises a central vertical shaft,
a radial bearing is arranged to an upper end the vertical shaft,
an axial-radial bearing, consisting of a cylindrical chamber filled with hydraulic fluid into which the end of the cylindrical shaft is fitted, or separate axial and radial bearings, is arranged to a lower end of the vertical shaft.

Preferable embodiments comprise features as described and defined in the dependent claims and the description and illustrated on the figures, which features can be combined in any operative combination, each such operative combination is an embodiment of the flywheel of the invention The flywheel preferably comprises a hydraulic axial-radial bearing arranged to a lower end of the rotor, wherein said bearing comprises a piston cylinder into which the lower end of the rotor fits or the lower end of the rotor comprises an inverse piston chamber that fits onto a support shaft, the bearing comprises a hydraulic fluid and means to pressurize the hydraulic fluid in a sealed volume between the shaft and bearing, wherein the weight of the rotor is supported by the hydraulic fluid as pressurized.

Preferably, the intermediate part of the rotor comprises a composite structure, comprising coaxial shell cylinders and steel radial armoring, said cylinders and armoring preferably made of steel, and filler material in between, said filler preferably is hardened concrete which has been poured into and hardened in the cylindrical rotor structure.

Preferably, the rotor comprises a series of channels that serve the purpose of possible mass adjustments for balancing the rotation of the rotor.

The flywheel preferably comprises:

an intermediate part of the rotor that extends radially out from the shaft, the intermediate part comprises a shoulder on the underside facing downwards, and a seat inside the housing enclosure, adapted to receive the rotor in a resting modus, with the shoulder of the rotor supported by the seat.

Preferably, the hydraulic axial-radial bearing comprises a hydraulic lift function, a hydraulic fluid expansion tank and a hydraulic pump, for lifting the rotor to an operating mode position or lowering the rotor to a resting mode.

The flywheel preferably comprises a half-sphere shaped lower end of the rotor shaft support bearing and a matching half-spherical shaped concave surface in the underlying support structure.

The flywheel preferably comprises an integrated or coupled combined motor-generator of any type suitable for the purpose or separate motor and separate generator.

Preferably, the rotor comprises permanent magnets or electromagnetic devices.

The flywheel of the invention comprises one or more of the following features, in any operative combination:

the large size rotor has mass of more than 5000 kg and may be preassembled or assembled and completed on site, and the rotor design consists of high strength load bearing structure made of steel or other suitable high strength material combined with a filler material where the primary load bearing material is arranged with axisymmetric and multilayer panels providing completed cylindrical enclosures, planar vertical radial panels and horizontal panels, all interconnected by welding or other connection methods, and the filler material fills voids of the load bearing structure, and the rotor is arranged with a strong cylindrical metal shaft in its central position and provides the connection with a lower and an upper support system, and the lower part of the shaft is shaped as a piston that closely fits within the piston chamber of the lower support system, and there is a hydraulic load bearing and lubricating fluid in the piston chamber onto which the piston rests with the weight of the entire rotor during rotation, and there is a pressurized hydraulic system in which the pressure is consistent with the weight of the rotor, leaked hydraulic fluid is recirculated and where the pressure is maintained by way of a pressure pump system, and the entire rotor can be lowered into resting position by reducing the amount of fluid in the hydraulic piston chamber and transferring it into an expansion tank, thereby facilitate removal and replacement of parts that are subjected to wear in the lower and upper supports, and the parametric geometric relations between the piston, piston block, middle block and base block is such that such replacements may be done, and there is one or several electromagnetic motor-generator devices that by way of external electric power source converts electricity to mechanical power that is stored in the form of increased kinetic energy in the rotor and reversely can reconvert kinetic energy from the rotor into electric power made available for external use when needed the rotor has several diametrically opposite voids that can be filled with adjustment mass components as part of rotor balancing system the piston and the piston block have parts that can be replaced the piston may have one or several grooves with sealing rings the piston may have an additional edge sealing ring inside the piston chamber there may be separate electromagnetic-mechanical devices for kinetic energy charging of the storage and for discharging additional start of rotation devices from stand-still condition the entire rotor and support system is enclosed in an air tight chamber with a detachable upper lid a system that controls the air or gas environment in the sealed chamber in terms of humidity, gas pressure, and gas composition, including the ability to reduce the pressure to very low levels a sealed entrance that allows for access to the flywheel chamber for inspection and repair bearing parts of the upper lateral support system may be replaced a cooling system for support system outside the rim to cool the parts of the support in case of emergency touch-down on the resting seat an electronic control system that by means of various types of sensors monitors the overall operation and condition of the storage and that is used to activate the various phases of energy charging and discharging the total energy storage system consists of a more than one flywheel and this battery of flywheels may share one or several operational functions such as air evacuation system, electric transformation and frequency regulation, activation control system, monitoring and safety system the invention also comprises a building method where the structural main load carrying parts of the rotor are assembled at site from several prefabricated parts and the filler material is thereafter cast step by step within the voids of this load bearing structure.

For preferable embodiments, with very heavy rotor, for example weighing more than 100 metric tons, the flywheel comprises a hydraulic axial bearing or a hydraulic axial-radial bearing supporting the vertical shaft of the rotor. For alternative embodiments, with lower rotor weight, for example weighing less than 100 metric tons, the invention can be combined with having mechanical bearings or magnetic bearings or other feature that may enhance the overall performance.

The rotor of the flywheel of the invention is heavy, weighing at least 5000 kg, and can be exemplified with any other amount of mass such as 7 metric tons, 10, 20, 50, 100, 500, 100, 2000, 6000, 10 000 or 20 000 metric tons, or any weight in this range.

The rotational speed of the rotor of the flywheel varies with the dynamic storage of energy during charging and discharging. The maximum rotational speed that the rotor can sustain depends on the materials, mass, size and geometry of the of the rotor; examples of which are maximum 6000 rpm, or 5000, 3000, 2000, 1000, 500, 100, 50 or 30 rpm or any number in this range.

In order to understand the core concept of the present invention, the features above must be compared with the teaching according to state of the art. As mentioned above, from equations (1), the total energy is a function of the square of the angular frequency and a function of the mass distribution and geometry. Further, a measure of flywheel "efficiency" is the maximum energy density as defined in equation (6); this is a function of maximum allowable stress of the material divided by its density. By combining these features, the objective of the current state of the art flywheels has been to provide solutions where the flywheels spin as fast as possible with materials that can sustain very high stresses in relation to their material density. There are associated drawbacks by such approach that should be considered. First, the friction problem grows strongly with high velocities. Much focus is thus placed on low friction suspension as with magnetic levitation and vacuum chambers. Further, the high energy density makes material failures "explosive". Furthermore, high performance materials with high strength to mass ratio are extremely expensive. The overall outcome is that current state of art flywheels are relatively small in size they and are not economically competitive as large scale energy storage devices; they are rather used for frequency and current regulation in electric grids. The main challenge has thus remained in developing a new flywheel technology that can provide large scale energy storage at an economically competitive price level. This is the overall objective of the current invention which introduces a completely new and different way of designing flywheels.

The present invention is beneficial with respect to all of the above-mentioned issues associated with very large flywheels.

The invention provides a way of transferring and storing large amounts of energy coming from an electric source in the form of kinetic energy and thereafter deliver this back as electric energy when needed. The system can serve as both a large scale energy storage and way of providing power to stabilize frequency and voltage in an electric grid setting.

The invention provides a kinetic energy, flywheel type energy storage system that is based on receiving and delivering electric power where the main components are:

1. A foundation and foundation structure that is strong enough to bear and sustain over time the static and dynamic forces exerted by the entire flywheel system 2. A spinning rotor that in principle is scalable to a size serving the overall energy storage objective of the system 3. A structural system within the rotor that provides necessary strength for carrying static and dynamic centrifugal forces associated with the load bearing structure itself as well as any mass or filler type material in between 4. A vertical shaft that goes through the rotor that connects the rotor with lower and upper support structures. The lower part of the shaft is formed as a rotating piston within the lower support bearing.

5. The lower support bearing for the piston provides very low friction load bearing capacity for carrying the weight of the rotor. The piston pressurizes with the weight of the rotor a hydraulic fluid that is contained within a fluid filled chamber around and below the piston. Further, the chamber with the piston and the hydraulic fluid serves as a hydraulic system that can be used to elevate and lower position of the rotor by pumping in or extracting fluid from the chamber.

6. A high pressure hydraulic system with pump system that keeps the rotor at desired height level and can recirculate hydraulic fluid that has leaked from the hydraulic chamber 7. An underlying disk structure that can be removed to allow for the abovementioned support to be replaced or repaired as part of maintenance procedures 8. An upper support system that keeps the spinning shaft in place and allows for the entire rotor to be raised and lowered. Also, this system may be replaced due to wear 9. A resting support system that is not in contact with the rotor when it is in rotational mode but that provides a support along the rim and can sustain the weight of the entire rotor when it is in resting condition during operational or maintenance brake condition 10. A capability for correction of mass distribution that allows for compensation of any mass distribution inequalities that might exist within the rotor in the initial condition due to fabrication imperfections and that could lead to vibrations or wobbling from mass imbalance 11. An electric motor system that can transfers electric power into kinetic energy for the rotor 12. An electric generator system that can transfer kinetic energy from the spinning rotor back into electricity. The motor and generator system may be the same.

13. An enclosure that fully separates and seals the flywheel chamber from the surrounding atmosphere and is strong enough to sustain pressure difference between the air/gas in the flywheel chamber from the external atmosphere as well as provide necessary strength to provide a safety barrier in case parts of the rotor should fail and break away 14. An air or gas control system that keeps the air or gas in the flywheel chamber at desired condition in terms of composition and pressure including the possibility for near vacuum condition to reduce rotary surface friction 15. A system for monitoring and controlling the operation and performance of the flywheel system. This system may contain various types of control devices and monitoring devices.

16. An access or entry system to the flywheel chamber to be used during inspection and repair operations. Such access ways may be in the form of sealed doors and tunnels as well as to include the possibility of removing the upper lid structure over the rotor and is a part of the overall enclosure system for the flywheel chamber.

17. A procedure for constructing, placing and adjusting the various parts of the total flywheel system 18. A possibility for combining several flywheels in a cluster to increase the overall capability for receiving/delivering power and to achieve the target of total energy storage The combined attributes that are described above provide the broad capabilities of the invention; however, there may be cases where certain parts of these attributes may not be necessary and the invention is represented in a simplified form.

A further description of the items listed above now follows:

Item 1 This refers to that the objective large mass flywheel will contain a very large mass of kinetic energy that may be in the order of 5 to more than 50.000 tons. The foundation must be very strong and solid to be able to support static and dynamic forces and thereby prevent dynamic vibrations followed by structural damage. In a typical embodiment of the invention the entire flywheel system would be built into an excavation on the ground, preferably into an excavated space in solid rock. There may also be cases where the storage may be built in gravel or sand type of soils. In such cases it may be necessary with extra strong foundation plate made of reinforced concrete combined with foundation piling. It may also be possible to build the storage above the ground; in such case the entire enclosing structure may have to be made extra strong for safety reasons.

Item 2 This refers to the rotor part of the system which is the active part that stores the kinetic energy in the system. The rotor has a size of mass of the order mentioned above; it is essentially a vertically oriented cylindrical body that spins around its vertical shaft. The materials used in the rotor will normally be high strength steel and high strength concrete that interact as a composite. Rock and gravel type materials from the excavation of the pit for the flywheel may be in some cases be used to make the concrete provided this material is of suitable quality. Alternative types of aggregate for concrete or for filler material may be selected on the basis of high density and/or high strength. Examples of aggregates or filler material that may be combined with concrete mortar are scrap steel, iron ore or iron pellets, or any other suitable type of rock or heavy mineral. Enhanced strength of concrete in the rotor may be obtained by use of unstressed or pre-stressed reinforcing steel bars or by use of fibers, typically steel or carbon fibers, which are mixed into the concrete itself and provide increased tension of hardened concrete.

Item 3 The rotor has to be strong enough to sustain static and dynamic forces exerted during operation. There has to be a strong, loadbearing structural system within the rotor; this is typically made of straight and curved plates of high strength steel that are welded or joined together. The steel part of the rotor system may pre-fabricated as structural blocks and welded together on site. The filler or concrete material is placed within compartments of the mention load bearing part of the rotor made of steel. The steel thus has two functions, namely to provide a load carrying structural system and secondary to serve as form work and containment for the filler or concrete. Concrete filler has also the function that it in itself may serve as a force and load carrying material, particularly with respect to carrying forces from the weight of the rotor itself.

Item 4 There is an accurately made, strong rotor shaft in the center of the rotor that connects the rotor with the lower and upper bearings. The rotor shaft is in most cases made of high strength carbon steel or suitable alloyed steel and it is integrally welded together with the load bearing structure described above. The lower part of the shaft extends below the main parts of the rotor as it provides the rotating connection part within a lower supporting system. This part of the shaft has to be made with extreme precision because it is factually a rotating piston that rests on hydraulic fluid and should as such provide a low leakage connection to the piston fluid chamber. There may be special provisions and attachments such as groves and seal rings interconnected with the piston part of the rotation shaft. The upper part of the rotation shaft also extends outside the main part of the rotor and must also be made with high precision since it shall be rotating without slack within an upper, lateral support system.

Item 5 There is a structural load bearing that carries weight and dynamic forces from rotor. In simple terms this is a strong and rather massive structure with an internal cylindrical hollow space that is consistent with the geometry of the piston part of the rotor shaft. This hollow support and containment system for the hydraulic fluid is typically made from cast or forged high strength steel. The internal cylindrical open cylindrical space is made with high precision mechanical machining. There will be drilled openings for hydraulic fluid to be filled into the hydraulic chamber to compensate for fluid being leaked out at the interconnection between the support and the rotating piston. The system is made such that this part can be removed and, if necessary, replaced since it is a part subject to wear.

Item 6 There is a hydraulic system that includes one or several pumps, valves, hydraulic fluid expansion tank, recirculation of leaked hydraulic fluid, connection with the hydraulic fluid chamber under the piston part of the rotor shaft, and automated system for monitoring and controlling amount of fluid in the piston chamber. The system is also such that the hydraulic fluid is used to raise the entire rotor from resting position on the resting support system (Item 9) to a higher position used during spinning of the rotor. Reversely, hydraulic fluid can be lowered from operation level down to resting position when the flywheel for some reasons is taken out of operational, rotating mode.

Item 7 As part of the practical implementation of the invention it may be necessary to remove the lower support bearing for maintenance or possible replacement of worn parts. This means that the support bearing has to be lowered and freed from the shaft piston while the rotor is in resting position. This may be done by letting the support bearing rest on an underlying "disk" or metal block that has sufficient thickness such that after removing the support block to the side the piston block can subsequently also be freed from the piston and worn parts are exposed for inspection, repair, or replacement. The hydraulic fluid may be drained form the fluid chamber during this operation. Notably the block on which the lower bearing rests can be attached to the foundation deck by bolts, side attachments or simply by having a shallow pit in the foundation deck. It will also be possible to make contact surface between the piston chamber and the support block as a spherical surface such that it may be possible to make precision adjustments in relation to the direction of the rotor shaft.

Item 8 The rotor shaft needs to be supported laterally at the top in order to be stable and rotate without vibrations. This can be achieved by a lateral support structure that connects the shaft with the wall of the external flywheel structure. The connecting parts between the support structure and the rotor shaft may be detachable bearing components that that will be subjected to wear and can be removed and replaced as part of the overall maintenance.

Item 9 The rotor must be stabilized and kept in resting position during construction and when the spinning is stopped for maintenance and repair. The lower outer edge zone of the rotor is made so that it can rest on a ledge or support that transfers the weight to the overall outer load bearing and support structure of the flywheel. There may be alternative positions for such a resting load transfer, preferably the support should be at edge of the lower side of the rotor. The rotor shall preferably have stopped fully before the rotor connects with the resting support system. There may be a facility for emergency stop of the rotor in which the rotor is still spinning somewhat when touch-down is made. The design should be such that the contact friction is low in order to prevent overheating of the contact surfaces. There may also be provided for a cooling system, e.g. by use of water, in order to keep contact heating under control.

Item 10 It may happen that, even with very strict tolerances for manufacturing, there may be some imbalance in mass distribution of the rotor that can exhibit unwanted vibrations or wobbling during spinning. To compensate for such rotor inaccuracies, as built, this may be adjusted for by an approach quite similar to the process of balancing a wheel of a motor vehicle. One way of implementing such adjustment is to provide vertical, open channels within the rotor. Such channels can simply be empty tubes that are cast into the rotor. The adjustment should be carried out after trial rotations and instrument readings by filling appropriate amounts of mass or plugs into the channels such that the end result is a perfectly balanced rotor in terms of vertical positioning and rotary mass balance.

Item 11 There are principally two ways by which the flywheel rotor may receive energy during energy charging. One approach is to use the rotor or the rotor shaft as the rotary part of an electric motor. Correspondingly there will be opposing stators along the rim. By alternating magnetic fields power may be transferred to the rotor. Alternatively, there will be dynamic energy charging by way mechanical force transfer from one or several electric motors by way of mechanical shafts that connects with a suitable location of the rotor. There may be cogwheels or other types of mechanical connection devices between the electric motor and the spinning rotor. It may also be possible to fully detach the connection between the flywheel rotor and the motors in order to remove energy loss from friction and magnetic fields. There are several different types of electric motor principles may be employed; this is not a part of the invention as such.

Item 12 Exactly the same approaches as described for the electric motors delivering power to the flywheel may be employed for the electric generators that transform the kinetic energy back into electric current. In fact, the motors described above may be the exactly the same as the generators. Alternatively, they may be different units for energy charging and energy recapture in form of electricity.

Item 13 The flywheel must be enclosed within a strong housing structure in order to provide sufficiently strong upper lateral support, lower vertical and lateral foundation support, and serve as an overall shell-type safety barrier that will prevent damage to the outside in case of spalling or failure of the rotor. In addition, the housing structure may provide an air tight barrier between the flywheel chamber and the outside; in this way the overall air or gas condition in the rotor chamber may be sealed off from the surroundings and also facilitate gas pressure reduction or near vacuum conditions.

Item 14 A main concern by all flywheels is to reduce energy loss from friction as much as possible. The rotor has a large outer surface and particularly the cylindrical outer wall may move at very high speed. The friction loss is a direct function of the surface speed, surface roughness and accuracy, and density of the air or gas in the flywheel chamber. It is possible to reduce the effect of all of these factors. In particular, provided that the flywheel chamber is fully separated from the surroundings by a sufficiently strong and air tight barrier it is possible to control humidity and reduce air pressure inside the rotor chamber. Air may even be replaced by another gas. However, the best effect is obtained by reducing pressure inside; this may be obtained by pumping air out of the flywheel chamber: the lower air pressure, the lower the surface friction loss will be. This principle is also well known from smaller flywheels in current use.

Item 15 There are two main functions of a flywheel monitoring and control system; first, to control the functions of charging and discharging energy into the flywheel, and, second, to ensure that the condition of the spinning flywheel is fully safe and, if not, activate measures to reduce risk of failure. Typical parameters to be monitored are rotary frequency, stresses and deformations in the flywheel structure including material fatigue and failure, unwanted vibrations in the rotor, condition of the rotor support system, the motor and generator system, and other relevant parts of the overall installation. The condition monitoring and operation control may typically be performed from an operation room and/or by remote systems.

Item 16 For safety and other reasons the flywheel chamber will be evacuated by people when the flywheel is in operation. The chamber also needs to be fully sealed off to enable air evacuation, see Item 14. However, it will be necessary to stop operations at times for inspections, maintenance and repair. One way of access is to remove the top cover (roof) of the flywheel chamber. Additionally, it will be convenient to have a separate access for people and equipment to get into the flywheel chamber. Such access may require strong, air tight doors as well as an air lock room. The most convenient access will be at down at floor level in the flywheel chamber.

Item 17 The construction process for the entire system depends on the size of the flywheel, the local ground conditions, on whether it is placed over or under ground, and what parts may be prefabricated before being brought to the construction site for installation and assembly. Acceptable size of prefabricated construction blocks may also depend on availability and condition of transportation routes by water, rail and road. Typically, the construction sequence will be site excavation, building of foundations followed by construction of the housing for the flywheel system. After mounting of the lower support system for the flywheel rotor the steel structure for the flywheel rotor may be assembled while it is resting on the edge support system. After finishing this steel construction process a mass filling material, typically some sort of concrete, may be cast into the rotor voids. Extra reinforcement and sensors may be placed in the rotor before the casting process. Post-tensioning of reinforcement may take place after concrete has hardened. Further work will typically be mounting of motors/generators, hydraulic system, instrumentation and other types of auxiliary systems. Finally, test rotations and mass balancing in the mass balancing channels may take place as a part of the commissioning.

Item 18 Clearly there are practical limits to how large one can make a single flywheel; this has to do with stressing due to own weight, increased hydraulic pressures and leakage of hydraulic fluids, magnitude of centrifugal forces, etc. However, such limits to overall energy storage capacity may be overcome by building several flywheel units next to each other. Clearly such batteries or configurations of multiple flywheels may share much of the common infrastructure. There may also be advantage with respect to flexibility in the way multiple flywheels are charged and discharged.

To illustrate the invention with some examples of how much energy one might store in a single flywheel of type defined by this invention are given below:

| External radius | unit | Case 1 | Case 2 | Case 3 | Case 4 |
| --- | --- | --- | --- | --- | --- |
| External rotor radius | m | 5.5 | 7 | 8 | 9 |
| Rotor height | m | 12 | 16 | 22 | 30 |
| Total rotor mass | tons | 2953 | 6363 | 11377 | 19554 |
| Rotary frequency | $s^{-1}$ | 12 | 10.2 | 9.4 | 9 |
| Kinetic energy | MWh | 10 | 25 | 50 | 100 |

FIGURES

The invention is illustrated by 9 figures, of which:
1. Overview and definition of main parts of storage
2. Outline of rotor
3. Rotor cross-section layout
4. Shaft with piston, lower load bearing and support block
5. Principle for removal and replacement of rotor block
6. Alternative positioning of motor/generators
7. Types of piston seals
8. Replaceable parts
9. Example of clustering of several storage units

NUMBERING AND NOMENCLATURE

| Number | Name | Description |
|---|---|---|
| 100 | Main rotor | Composite structure, typically steel and concrete |
| 101 | Central shaft | High strength and precision steel tube |
| 102 | Piston | Cast or wrought, milled steel |
| 103 | Load bearing structure | Steel structure transferring forces within rotor |
| 104 | Rotor support block | Steel support unit for the rotor |
| 105 | Mass adjustment channels | Open tubes that can be filled (partly) with mass material |
| 106 | Cylindrical walls | Bent steel plates |
| 107 | Horizontal reinforcement layers | Steel plates |
| 108 | Filler material | Typically high strength reinforced concrete |
| 109 | Conical steel walls | Bent steel plates that encloses the rotor |
| 110 | Shaft filler material | Empty or light weight concrete |
| 111 | Vertical shear walls | Steel plates |
| 200 | Condition controlled air/gas rotor chamber | Low pressure to reduce surface friction for rotor |
| 201 | Housing structure | Strong reinforced concrete enclosure |
| 202 | Roof structure | Removable roof structure |
| 203 | Air seal | Sealing material |
| 204 | Lower support block | Steel foundation for resting main rotor |
| 205 | Upper lateral support | Connects upper part of central shaft with housing structure |
| 206 | Outside soil or rock | Contact zone for the housing structure |
| 300 | Expandable fluid chamber | Space between piston and piston block |
| 301 | Piston block | Cast or wrought, milled steel |
| 302 | Removable middle block | Cast or wrought, milled steel |
| 303 | Hydraulic fluid | Oil type fluid with appropriate viscosity |
| 304 | Fluid leakage collector | Circumferential channel that collects leaked hydraulic fluid |
| 305 | Fluid filling and drainage pipes | Fills or removes hydraulic fluid to/from expandable chamber |
| 306 | Overflow pipe | Drains fluid from leaked fluid collector |
| 307 | Pump system | Pumps fluid into tank and pumps fluid into fluid chamber |
| 308 | Fluid refill and expansion tank | Non-pressurized fluid tank |
| 309 | Fixing bolts | High strength bolts |
| 310 | Base block | Cast or wrought, milled steel block that connects with foundation |
| 311 | Flat or spherical contact surface | Curved surface may allow for adjustment of central axis |
| 312 | Piston sealing ring | Wear resistant, high pressure sealing ring |
| 313 | Groove for sealing ring | Groove in the piston in which the sealing ring is placed |
| 314 | Edge sealing ring | Attached to the lower edge of the piston |
| 315 | Replacement wear part for piston | High strength wear part fitted onto the piston |
| 316 | Replacement wear part for piston block | High strength wear part fitted inside the piston block |
| 317 | Replaceable upper bearings | High strength wear parts that can be replaced |
| 400 | Electromagnetic rotor | Electromagnetic elements attached to the rim of the rotor |
| 401 | Electromagnetic stator | Electromagnetic elements attached opposite to rotor elements |
| 402 | Combined motor and generator | Several units can be place inside chamber |
| 403 | Motor shaft | Detachable connection between motor and flywheel rotor |
| 404 | Motor cogwheel | Rotary mechanical connection |
| 405 | Rotor ratchet | Corresponding ratchet connection on the rotor |
| 500 | Flywheel unit | One of several complete flywheel energy storage units |
| 501 | Common access way | Underground access down to flywheel chamber floor level |
| 502 | Air lock chamber | Each flywheel unit has a separate air lock chamber |
| 503 | Low level underground access tunnel | Provides entrance to the chamber of a flywheel unit |
| 504 | Air lock sealed doors | Double pressure holding door system for access |
| 505 | Air evacuation pump | Pump system to reduce air pressure in the flywheel chambers |
| 506 | Transformer and electric control | One or several units for controlling the overall electric system |
| 507 | Operation control room | Monitoring and operational control center |

DETAILED DESCRIPTION OF THE INVENTION

FIG. 1 illustrates the main parts and principles for the large scale flywheel system according to the present invention. This system may in principle be built above ground whereas in most cases placing the storage in an excavation in the ground 206 may be a better embodiment for safety and other reasons. The storage is contained in a strong structural encasement or housing 201, preferably made of reinforced concrete. This encasement has a removable roof or lid 202 that serves for protection as well as for a seal that enables reduction of the internal pressure in the rotor chamber 200 to be lowered. The roof structure has an air-tight seal 203 along the rim that prevents outside air from leaking into the rotor chamber. There is open access to the entire flywheel system when the roof 202 is removed. Additionally, there is a sealed access 503 to the rotor chamber from outside exemplified in FIG. 9.

The rotor of the flywheel 100 is a composite structure made of easily accessible and cost effective materials such as primarily high strength steel and high strength concrete for filler material 108. The filler material or concrete may be reinforced with reinforcement bars, primarily in the ring direction, and/or pre-stressed reinforcement cables. The material may, if necessary, be mixed with reinforcement fibers. The layout and composition of the composite structure is such that it can sustain static as well as dynamic stresses.

At the core of the rotor there is a cylindrical shaft or rotor shaft 101. This is typically a high precision, thick-walled steel cylinder or tube that forms an important part of the load bearing system; it also forms the connection between the rotor 100 and the support structure 301, 302, 310, 205. The lower part of the shaft extends below the main rotor body and is formed as a piston 102; this forms the connection with the lower support system 301, 302, 310. Likewise, the upper part of the shaft extends above the main rotor body and forms the connection with the upper support system 205 and replaceable wear parts 317. Hollow spaces in the shaft may be filled with concrete or other suitable strengthening material 110.

Figure 6:
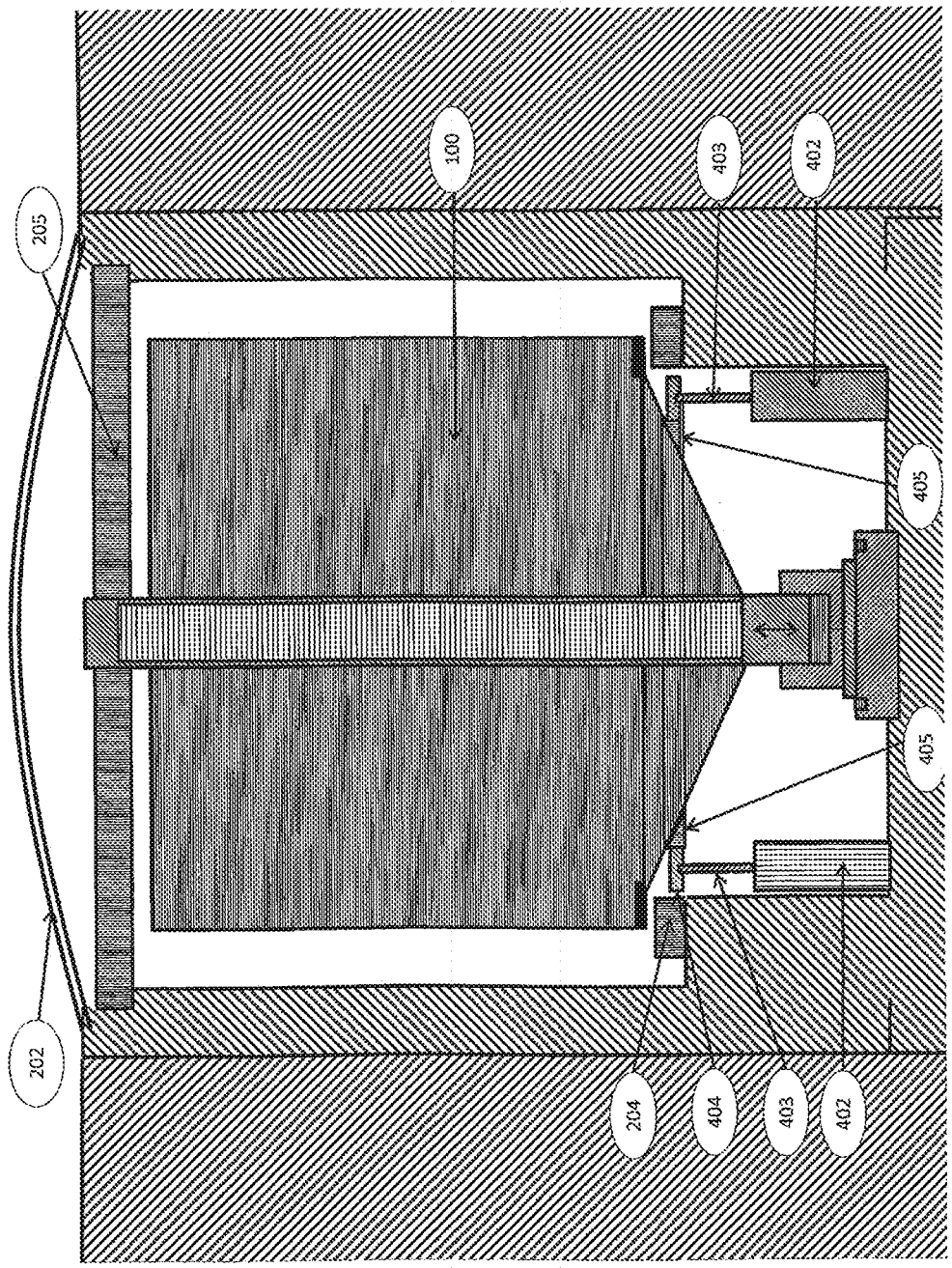

The flywheel is equipped with an electric motor/generator system that is used for converting electric power from an outside source to increased kinetic energy associated with faster rotation of the rotor. Reversely, the same system may be used as electric generator for converting kinetic energy back to electric power to be supplied to the outside. Systems relating to conversion between alternating and direct current, and electric voltage and frequency regulation are outside the scope of the invention. In the specific case shown in FIG. 1 the electromagnetic stator system 401 is placed along the internal side of the surrounding structure and the electromagnetic rotor 400 is placed opposite along the outside of the flywheel rotor 100. There may be other ways of configuring the electric motor/generator system such as shown in FIG. 6. The electric motor system may be used for starting the flywheel rotor motion. Alternatively there may be supplementary electric start engines or mechanical systems such as pre-stressed tension wires for the start-up phase from zero rotation.

There is a support system for the rotor that is used during construction as well as for shut-down for maintenance and repair. The lower rim of the rotor is reinforced with a resting connector 104 that transfers the support forces, corresponding to the rotor weight, between the rotor and the housing and support structure 201. Similarly, the under lying support structure is also equipped with a strengthened contact part 204. Examples of suitable materials for the contact zones are steel or cast iron, whereas other metals may also be used. The lower support structure may be equipped with a water based cooling system to prevent overheating when moving surface contact is made during fast shut-down.

The lower support system provides both vertical and horizontally lateral support for the rotor. The lower support system is explained in further detail in connection with FIG. 4.

Figure 2:
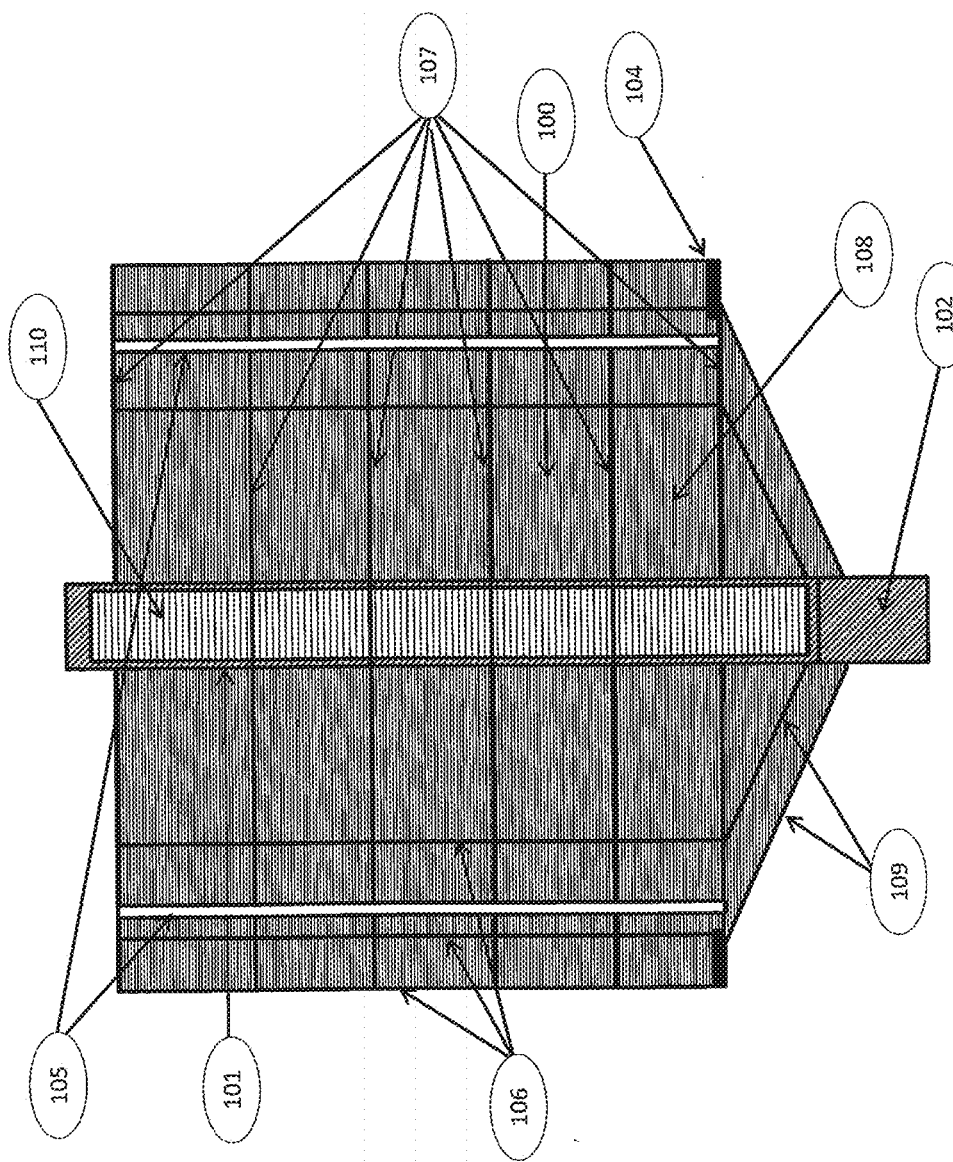

FIG. 2 shows a vertical cross-section of an embodiment of a rotor. Concentric steel cylinders 106 provide circumferential strength that to a large extent resist centrifugal inertia forces. Additionally, horizontal steel plates 107 provide extra strength for balancing the same forces. The spaces between the steel structures are filled with suitable filler material 108. An example of this is high strength concrete. Good bonding between steel and concrete is an advantage since best strength is obtained when the two materials interact as composite. Enhanced bonding may be achieved by sand blasting of steel surfaces and by mechanical connectors such as bolts and dowels. Tension strength is significantly lower than compressive strength for concrete. The tension strength may be increased by use of additional reinforcement bars in the concrete. Another measure to strengthen the load bearing capacity in tension is to mix steel fibers into the concrete. The figure also illustrates that there may be a conical lower structural section 109 of the flywheel 100. The purpose of this is to improve the load bearing capacity of the rotor and to provide open space below the rotor.

The figure also shows vertical mass adjustment channels 105 that initially will be empty but that may partly be filled with material after the overall completion of the rotor and initial balancing and rotation tests are performed. This process is similar to mass balancing of a car wheel and serves the purpose of avoiding unwanted vibrations in the rotor system.

Figure 3:
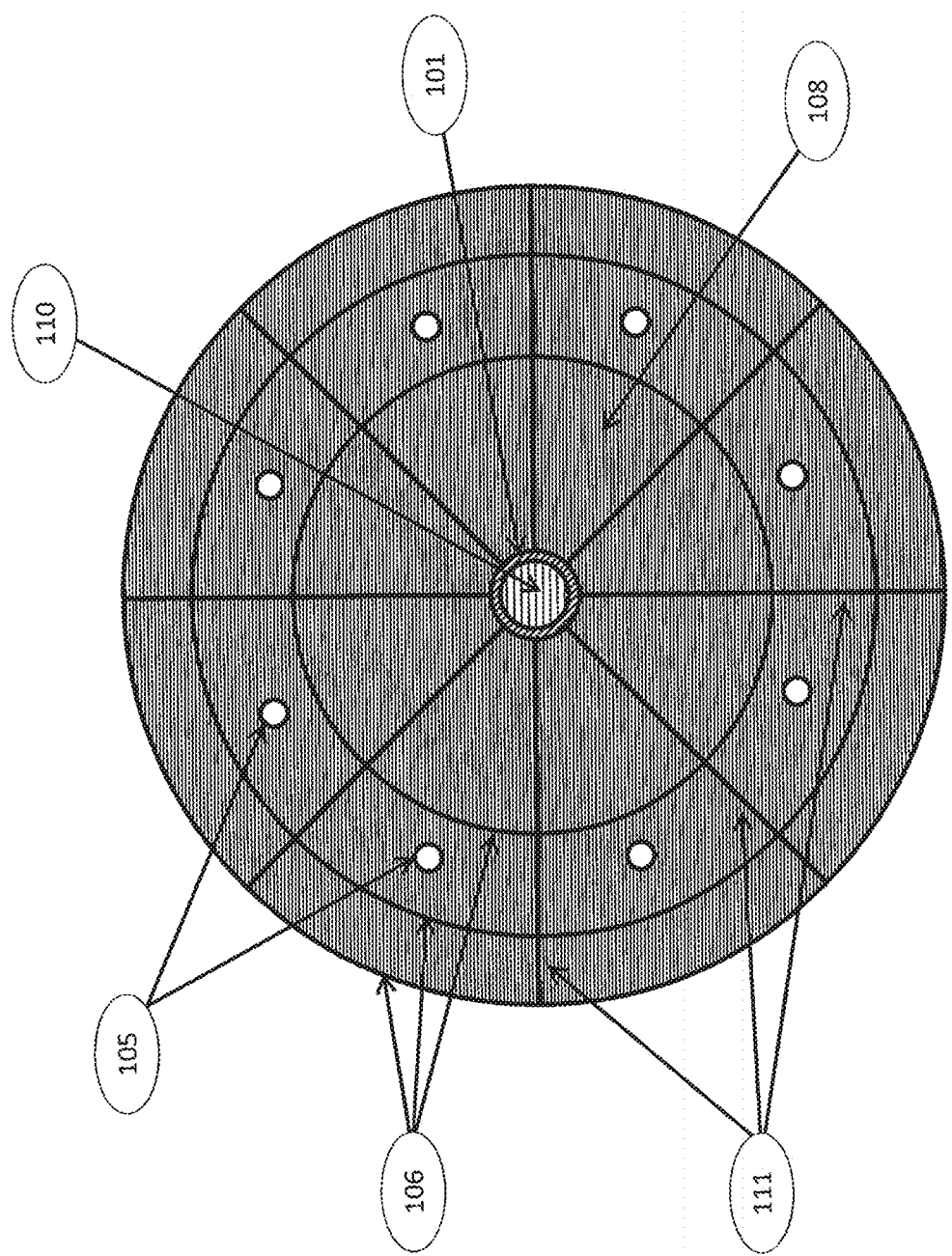

FIG. 3 corresponds to FIG. 2 whereas it shows a horizontal cross-section of the rotor 100. The figure also shows vertical, radial steel walls 111 that connect with the central shaft 101. These steel walls serve as a structural purpose in that they can transfer rotary inertia forces to the central shaft. Equally important these vertical walls transfer gravitational forces (weight) from the entire rotor onto the central load carrying shaft 101 which in turn rests on the lower support system during operation. Similarly, these walls help in carrying weight to the lower rim supports during resting condition. The totality of steel parts shown in FIGS. 2 and 3 make out the steel load bearing structure 103. Further, it is clear that a rotor filler material such as concrete 108 will also take part together with the steel in carrying stresses for the load conditions described.

Figure 4:
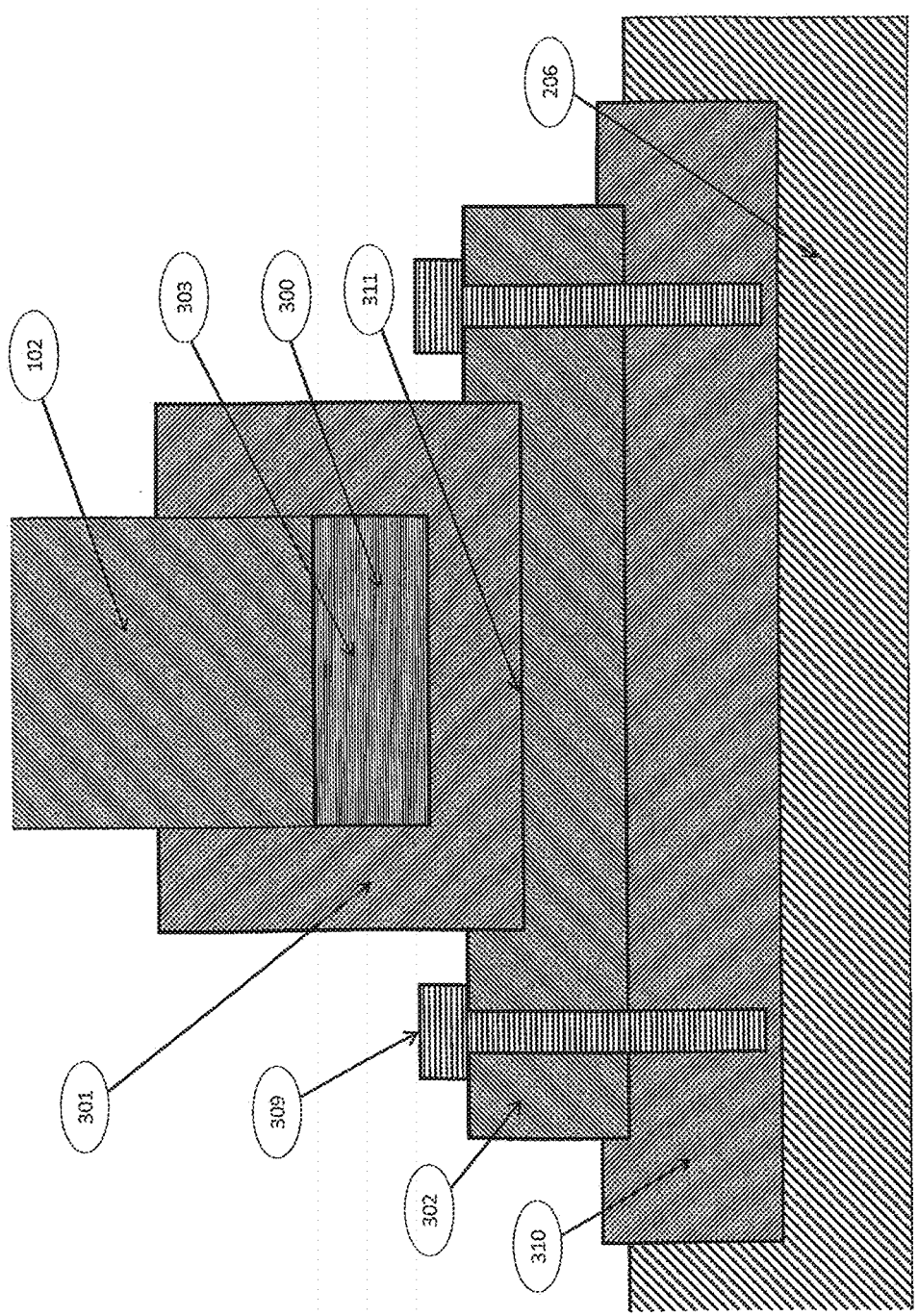

FIG. 4 shows the lower support system for the rotor. The central shaft of the rotor 101 has the form of a cylinder that it provides the connection with the support system below; this part of the shaft is denoted the piston 102. It fits with high degree of accuracy into the supporting piston block 301 that has a hollow cylindrical space 300 with equivalent diameter as for the piston and has a bottom floor that lies below the lowest possible position of the piston. The space below the piston thus forms a closed chamber that is filled with hydraulic fluid 303, typically this being oil, with suitable consistency in terms of viscosity and lubrication properties. Notably the fluid will be under pressure that counteracts the entire weight of the rotor. As already explained, this pressure is given by the total gravitational force from the rotor divided by the cross-sectional area of the piston. The rotor block has dimensions and strength sufficient to carry the internal pressure from the hydraulic oil. The rotor block must also be locked into the removable middle block 302 below in such a way that it does not start rotating along with the rotor shaft.

Considering that the hydraulic fluid, normally oil, will be under very high pressure from the weight of the rotor it seems unavoidable that there could be continuous, small leak of hydraulic fluid that escapes from below through the contact zone between the piston and the rotor block. This fluid can easily be collected by simple means such as collection channels 304 and drain pipes 306 and later be pumped by a pump 307 and pressure pipe 305 into the oil chamber 300 again. This system of collecting fluid, high pressure pump, expansion tank and recycling fluid back into the fluid chamber is indicated in FIG. 1. The pump system must have capacity for exerting fluid pressure that is larger than the fluid pressure in the chamber 300. Fluid is taken from the expansion tank 308 when the rotor is raised from resting position. Reversely the rotor can be lowered, when this is desired, to its resting position by a vent control system that releases hydraulic fluid back into expansion tank 308.

There may be alternative ways of providing for reinjection of escaped hydraulic fluid; typically this may be by way of a one-step or multi-step pump system.

Figure 5:
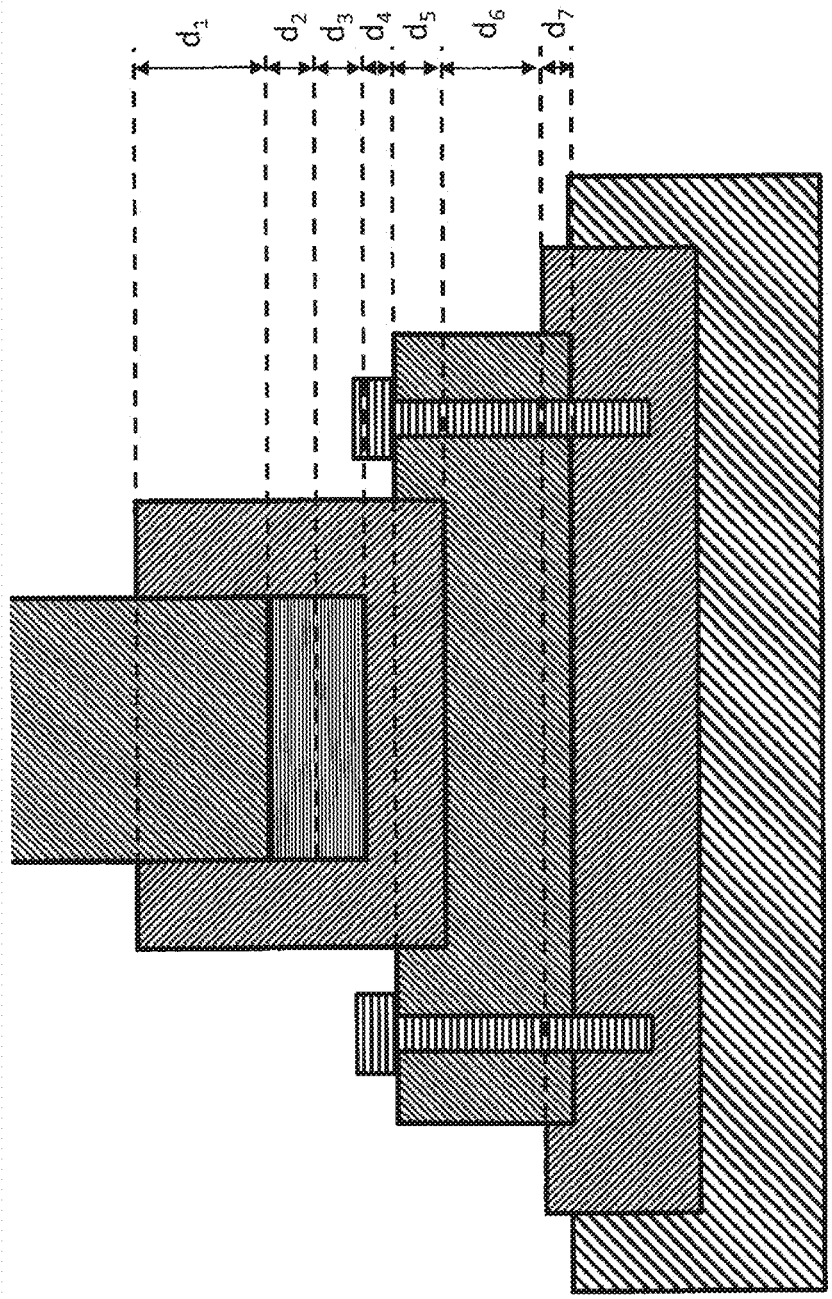

FIG. 5 explains in further detail the rationale for a particular embodiment of the lower support system. The main point of this system is that it should be possible (a) for the rotor to rest on the side support system 104, 204 in construction and resting position, (b) to be raised from this support system during spinning condition, and lastly (c), be possible to remove and replace the lower support system 301, 302, 310 when the rotor is in resting position, typically in connection with maintenance, repair and replacement of parts. Removal of these parts will also expose the piston 102 for inspection and possible repair or replacement.

The procedure for removal of the lower support is as follows: fluid is drained from the fluid chamber in a controlled manner into the expansion tank such that the rotor is lowered by distance $d_2$ at which the rotor will be resting at the support block 204. Oil is further drained from the fluid chamber such that rotor block can be raised by distance $d_3$ up to the same level as the lower edge of the piston. The lower edge of the rotor block can now be lifted so that the total height of the middle block $(d_5+d_6+d_7)$ can slip out to the side between lower edge of the rotor block (in raise position) and the upper edge of the foundation block based on the following requirement:

$$d_3+d_6>d_5+d_6+d_7 \text{ which gives } d_3>d_5+d_7 \quad (9)$$

The next requirement is that it should be possible to remove and replace the rotor block. That means that the total height of the rotor block should be able to slip between the lower side of the piston in resting position and the upper side of the foundation block (the middle block has already been removed). This gives and additional requirement:

$$d_3+d_4+d_5+d_6>d_1+d_2+d_3+d_4+d_5 \text{ which gives } d_6>d_1+d_2 \quad (10)$$

Clearly the fixing of the bolts for the removable blocks have to be taken out before the procedure is started.

The opposite procedure shall be followed when the parts are replaced, that is, the rotor block is put into position before the middle block.

A further refinement of the support system is a possibility for perfect alignment of the axis of the piston block 301 in relation to the rotor axis that goes through the center of the upper, lateral support 205. This may be done by forming the lower side surface 311 of the piston block 301 and the corresponding upper contact side of the middle block 302, see FIG. 4, as a sphere section with radius equal to the distance from the surface up to the center of the upper lateral support. The actual shape of a spherical contact surface between piston block 301 and middle block 302 is not shown in the figure.

The particular design described for the lower support structure serves as an illustration of how an embodiment of invention will be able to satisfy requirements for practical construction, maintenance and repair. Alternative ways of designing the support structure are also feasible.

FIG. 1 along with FIG. 6 illustrates how electric devices with the property of being both electric motor and electric generator can easily be connected with the flywheel rotor. As explained in connection with FIG. 1 the electromagnetic stator 401 and rotor 400 parts may be placed along the outer, cylindrical rotor wall. A disadvantage by this solution is that there could be some magnetic resistance during freely rotating storage mode when the system is neither charging nor discharging. An alternative to this, see FIG. 6, is to have one or several motor/generator units 402 connected via rotating shafts 403 and cogwheels 404 to the flywheel rotor with ratchets 405. There may be different positions for such units; one such embodiment is shown in FIG. 6. An advantage by this way of connecting separate motor/generator units with the flywheel rotor is that they can easily be fully detached by retracting the connection between 404 and 405. Such connection may also be combined with a clutch such that the sudden impact when the units are engaged with the rotor in full motion does not overstress the connection.

A special challenge occurs when the flywheel rotor has to be put in motion from a full standstill position. The fluid supported system is designed such there will be only minor friction that has to be overcome whereas the rotary inertia of the rotor may be formidable. Starting the rotation from standstill by way of motors will require substantial power; this may be obtained by a separate starting motor or by facilitating extremely low gearing from the motor/generator units. Alternatively, one may resort to other types of start-up devices; examples of which are pressurized air devices or cable connected heavy weights that will start the turning motion before the normal electric motors/generators are engaged.

The pressure in the piston chamber is simply given by $$p = \frac{M_R g}{\pi R_p^2} \quad (11)$$

where $M_R$ is mass of the rotor, g is the acceleration of gravity, and $R_p$ is the radius of the piston. Considering that the weight of the rotor may be thousands of tons it is clear that the required piston diameter is directly linked to the rotor mass and the fact that the hydraulic pressure in the piston chamber must be kept at an acceptable level comparable with oil pressure in other types of hydraulic systems. Given that the hydraulic pressure may in itself be a prescribed design parameter equation (12) may be used to calculate the appropriate radius of the piston $R_p$.

Figure 7:
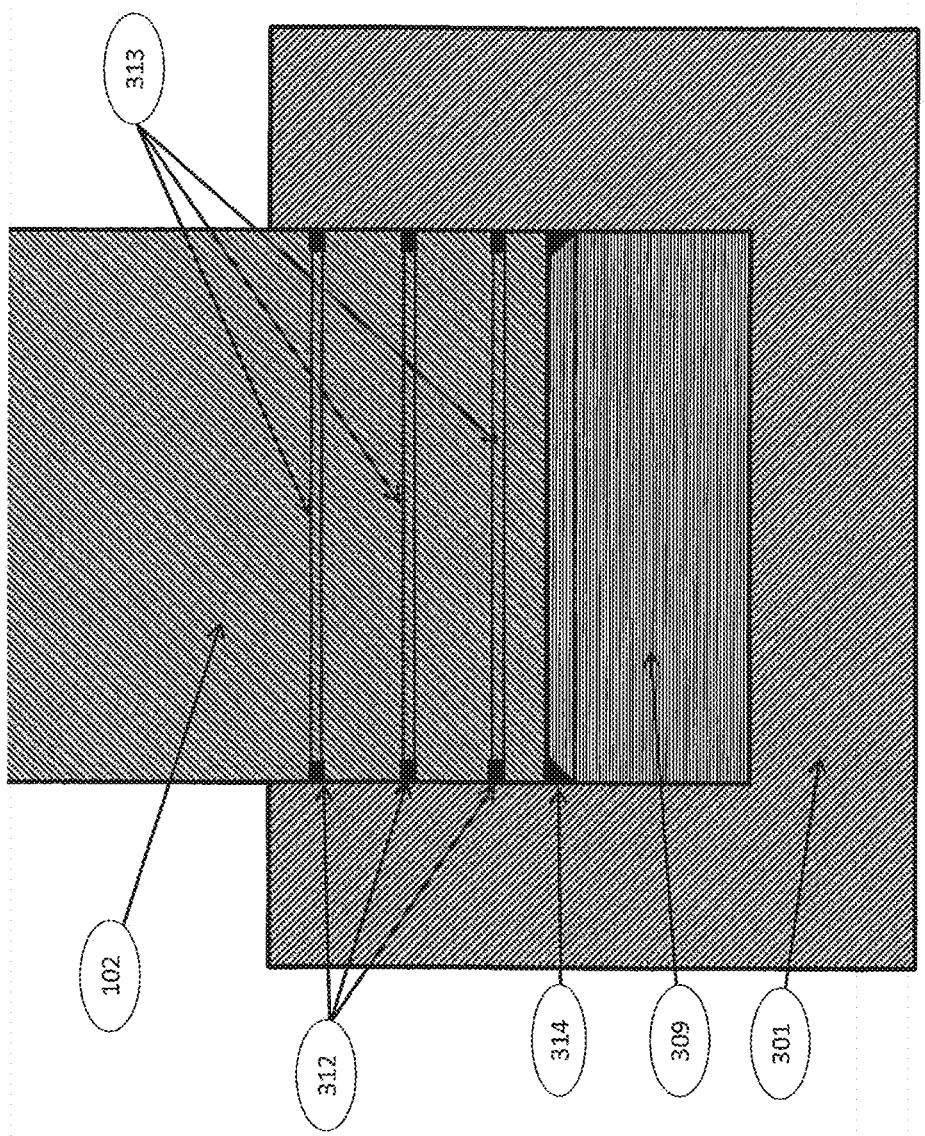

The piston shown in FIG. 7 is rotating in along with the rotor motion. Unlike a piston in a combustion engine or in a hydraulic actuator, there is no continuous up and down motion; in the present case the motion is purely rotary nature during operation. It is common in hydraulic systems that the oil pressure is up to a level of 50 bars; pressures of the same order in the piston chamber may also be acceptable for the present invention. Considering such pressure levels, it is important to avoid excessive leakage of hydraulic fluid from the piston chamber. In addition to ensuring high precision fabrication several measures can be taken to reduce leakage of hydraulic fluid 303. As for conventional pistons in combustion engines the rotor piston may be equipped with multiple ring seals. FIG. 7 indicates, as an example, three such sealing rings 312 for the piston of the present innovation. Such seals may work even better in the present situation than seals for pulsating pistons since there is no up and down motion and the sealing rings are uniformly pressured against the upper rim of the groove 313 in which it is placed. Having several ring type sealing barriers will work better than having one because the pressure difference between the piston chamber and the outside gas pressure it dealt with in several pressure steps. There may also be an additional edge sealing ring 314 on the inside of the piston 102 in the piston chamber 300. The pressure in the piston chamber will press the seal against the corner between the piston chamber and the lower surface of the piston and thereby provide an effective sealing action. It is important that all seals are made sufficiently strong and with durable materials, such as wear resistant metals, ceramics or composites, since the rotational motion of the piston implies that there will be wear. Additionally, the present invention also implies that the piston block 301 can be removed for maintenance and that the sealing rings may be repaired or replaced.

Figure 8:
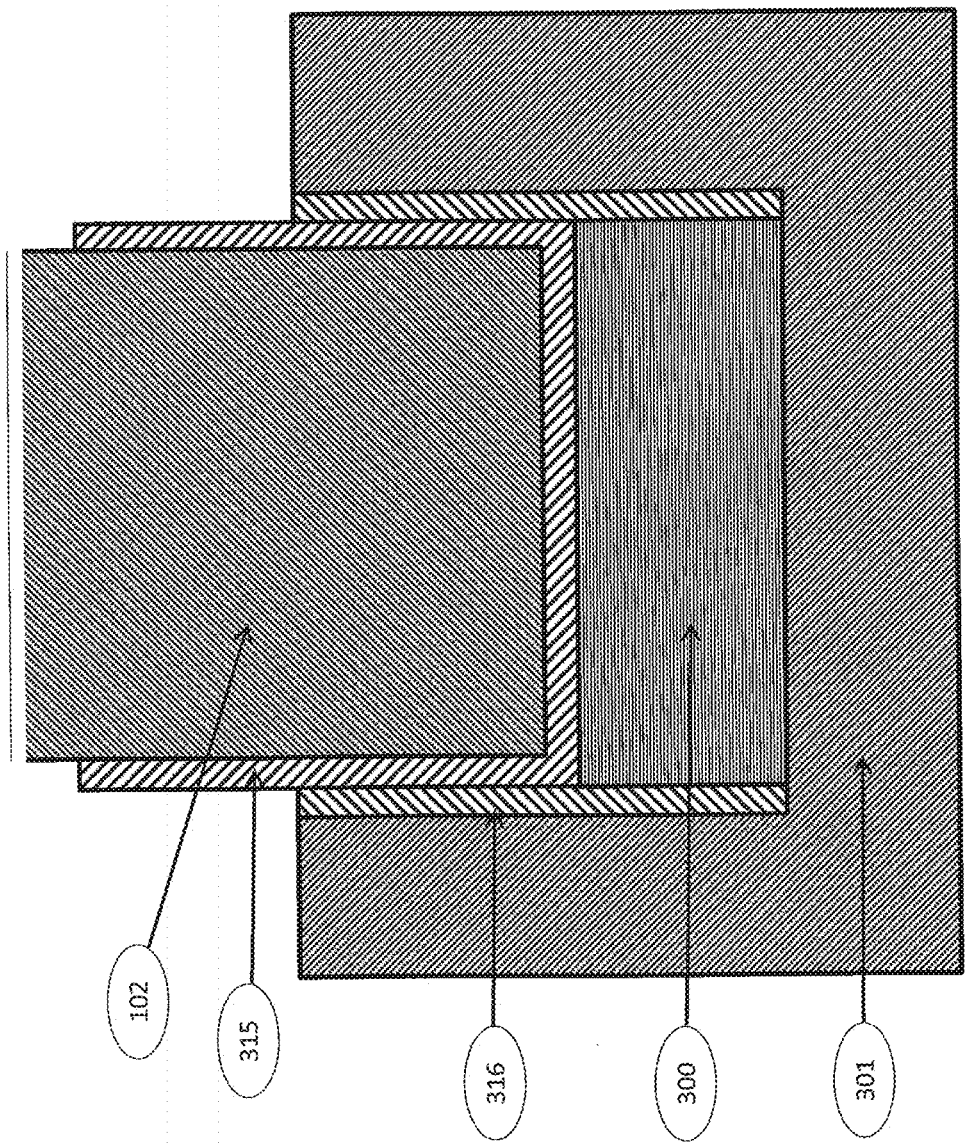

The current invention with removable parts allows for extensive repair of parts that are susceptible to wear. The most critical such parts are the piston 102 and piston block 301 at the lower end and the bearings 317 at the upper support 205 of the rotor shaft. The procedure for getting access to such repair at the lower end has been described in connection with FIG. 5. In addition to replacement of the sealing rings described in connection with FIG. 7 there may be need for repair of wear on the piston itself or the inside of the piston block. As shown in FIG. 8, the piston block may have fused, welded or thermal shrink-fitted additional material 316 onto its cylindrical surface to correct for material wear due to friction. Removal and replacement of layers suffering from substantial wear may be part of the overall maintenance procedure. Similarly, the outer layer of the piston may consist of a replaceable, wear layer 315. This replaceable layer may also include groves and sealing rings. This is not shown in FIG. 8 since it is already shown in FIG. 7.

The upper, lateral support system 205 shown in FIG. 1 may equally be equipped with parts 317 that can be replaced due to wear both for the contact surface of the shaft and for the contact bearing of the lateral support structure. This is equivalent to FIG. 8 but it not shown in detail in a separate figure.

Figure 9:
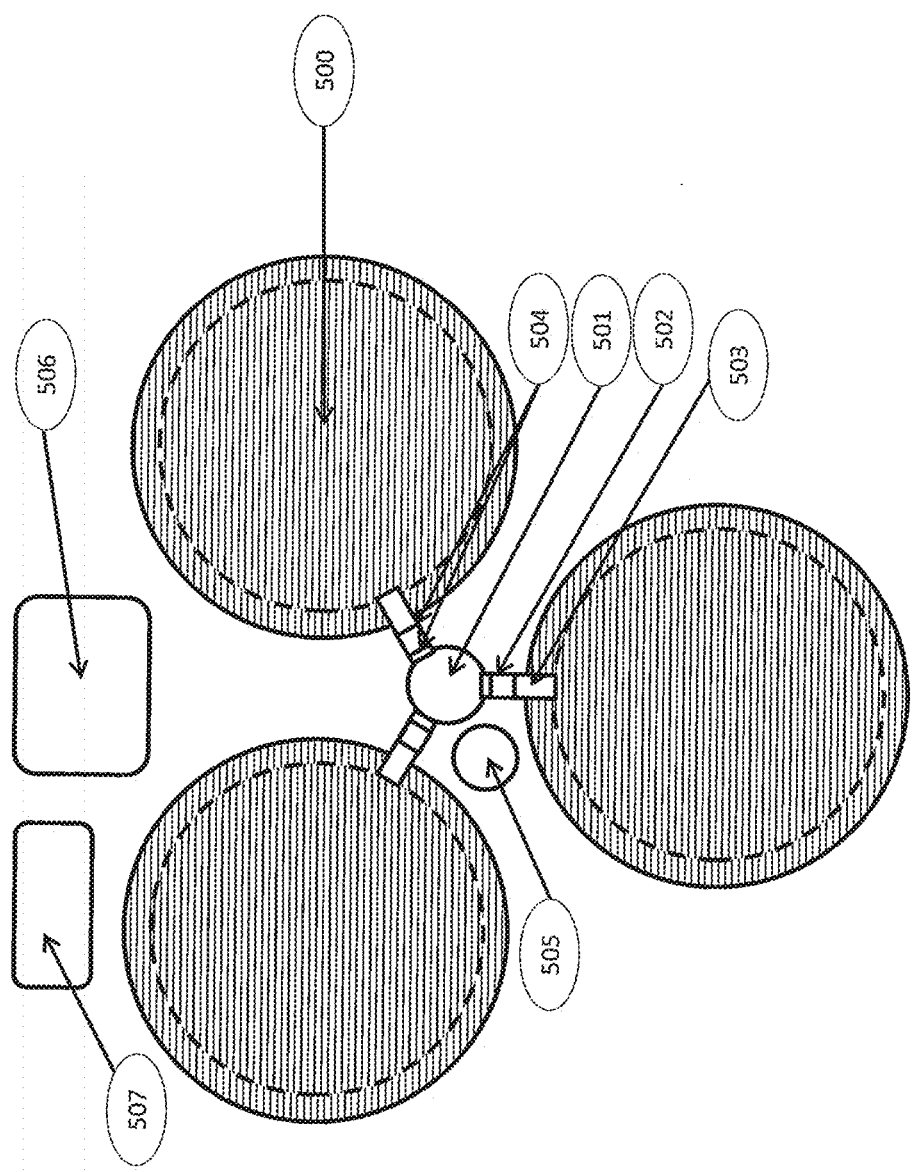

FIG. 9 shows how a multiple of flywheel storage units can be clustered together in order to meet almost any total demand for storage capacity even when a single flywheel has lower storage capacity. In the example shown three flywheel storage units 500 are combined in a cluster. Any other number of flywheel units 500 may also make out the totality of a flywheel storage park using various ways of clustering these together. In FIG. 9 the three flywheel storage units are built into the ground and have a common access tract or access way 501 down to the lower service level where it branches out with separate access tunnels 503 to the separate units 500. The figure also indicates how the access ways 503 to the inside of the inside of the flywheel chamber may be equipped with an air lock system consisting of double air lock doors 504 (air tight seals) and air look chamber 502. Several flywheels may share the same air evacuation system 505. It is also illustrated that auxiliary functions may be commonly shared, such as surveillance and operation control room 507, and electrical systems 506 such as transformers, frequency and voltage control, etc.

The construction method depends on the size of the flywheel storage and local conditions. In principle parts that weigh about 50 tons or less may be transported by road and rail. This also means that flywheel rotors and housing components with appropriate weight may in principle be fully prefabricated and transported to site for installation. Thus, for storages with transportable rotor weight it may be possible to fully prefabricate the flywheel rotor. In most cases the flywheel housing structure 201 will have to be built on site.

Large flywheel systems will have to be constructed in a step-wise fashion when the complete rotor weight does not allow for transportation. Referring to FIG. 1 it is seen that the foundation and housing structure will typically be built directly at site; in most cases by use of reinforced concrete. In most instances it may be preferable to build such housing structure underground. Alternatively, it may also be possible to build the entire system above the ground although this may require additional safety measures in case something goes wrong during operation.

The construction of the housing structure and assembly-construction of the rotor may be done in a timewise parallel manner. The housing structure will normally be constructed by a continuous process of excavation, making casting forms, installing reinforcement and casting concrete. The lower support system for the rotor has to be completed before the installation process for the rotor can begin. The steel structure of the rotor may be assembled from different block modules, such as rotor shaft with piston different prefabricated section steel modules that make out the totality of the rotor steel structure. These modules may be assembled and welded together to provide the entire steel skeleton of the rotor. Clearly there will be openings in the steel structure, not shown in FIGS. 2 and 3, that allow for access for workers and ways of pumping and pouring concrete during the casting process. Note that the rotor will be resting on the rotor support blocks 104, 204 during the assembly and casting process. The casting of the concrete should only start after the steel structural part of the rotor has been completed and the concrete reinforcement has been installed. The concrete casting starts with filling the lower compartments of the rotor structure and gradually moves upwards until the entire rotor has been filled with concrete. This process should be closely monitored with respect to progress and temperature since the chemical binding process for cement and water generates heat that could damage the concrete in case of overheating.

In addition to using normal steel reinforcement bars it may be desirable to use high strength steel cables that are pre- or post-tensioned after the concrete has been cast and sufficiently cured. Such post-tensioning reinforcement may be employed both in vertical direction (tensioning from above) as well as in ring direction (with tensioning anchors near the outer cylindrical surface of the rotor). The concrete may also contain reinforcement fibers that are mixed with the concrete before casting. The interior surfaces of the rotor steel structure may be equipped with mechanical devices such as dowels and/or be specially treated to increase the bonding between steel and concrete. A clear objective is to make the steel-concrete structure work as an interactive composite that carries gravitational and inertia forces in an effective way; hence, the concrete should not be just a mass filler material.

There are many ways of optimizing the performance of the rotor structure in terms of material strength and placing of mass that is carrying the kinetic energy. High density concrete may be obtained by using particularly heavy rock type aggregates such as basalt, gabbro, olivine, peridotite etc. Metal ores may also be added for increasing the mass density of concrete, such as hematite and magnetite (iron ore).

Scrap iron parts or iron pellets may also be used to increase rotor mass. As seen from equation (1) the energy density and centrifugal forces during rotation are highest for the layers farthest away from the axis of rotation whereas zones near the axes may be considered as structural load bearing parts that are less stressed. It may thus be desirable to use different types of concretes in terms of strength and mass density for the different zones within the rotor structure.

Other types of applications that are not land based may also be envisioned. For instance, one may foresee that this type of energy storage may be of interest for offshore installations to facilitate use of intermittent renewable energy such as wind and waves. Further, it may be possible to install the invention in the hull of ships, e.g. ferries, coastal vessels, waterway vessels, such that they can run on electric energy. In such cases the charging of the flywheel storage can be carried out whenever the ship is in port. For ship applications it may be most advantageous to use flywheels that are made mainly or entirely of steel.

The invention claimed is:

1. A flywheel for energy storage, the flywheel comprising:
a rotor configured to rotate;
a housing enclosure;
an electric motor for charging energy by transferring electric energy to stored kinetic energy in the rotating rotor and an electric generator for discharging energy by transferring stored kinetic energy in the rotating rotor to electric energy;
wherein the rotor is vertically oriented;
wherein the rotor comprises a mass of over 5000 kg;
wherein the rotor comprises a central vertical shaft;
wherein a radial bearing is arranged to an upper end of the central vertical shaft; and
wherein a radial bearing is arranged to an upper end of the central vertical shaft; and
wherein an axial-radial bearing, comprising a cylindrical chamber filled with hydraulic fluid and an end of the central vertical shaft is fitted into the hydraulic filled chamber, wherein the axial-radial bearing is arranged to a lower end of the central vertical shaft.

2. The flywheel according to claim 1, wherein the axial-radial bearing comprises a hydraulic axial-radial bearing.

3. The flywheel according claim 1, wherein:
an intermediate part of the rotor comprises a composite structure;
the composite structure comprises coaxial shell cylinders and steel radial armoring, the coaxial shell cylinders and armoring made of steel and filler load bearing material is arranged with axisymmetric and multilayer panels providing completed cylindrical enclosures, planar vertical radial panels and horizontal panels, interconnected by welding or other connection methods, and the filler material fills voids of the load bearing structure;

the central vertical shaft comprising a cylindrical metal shaft located in a central position thereof and provide a connection with a lower and an upper support system;
a lower part of the cylindrical metal shaft is shaped as a piston that closely fits within a piston chamber of the lower support system;
a hydraulic load bearing and lubricating fluid in the piston chamber onto which the piston rests with a weight of the rotor during rotation;
a pressurized hydraulic system in which pressure is consistent with the weight of the rotor, leaked hydraulic fluid is recirculated and where the pressure is maintained by way of a pressure pump system;
the rotor can be lowered into a resting position by reducing an amount of fluid in the hydraulic piston chamber and transferring it into an expansion tank, thereby facilitate removal and replacement of parts that are subjected to wear in the lower and upper supports;
parametric geometric relations between the piston, piston block, middle block and base block is such that such replacements may be done;
one or several electromagnetic motor-generators that by way of external electric power source converts electricity to mechanical power that is stored in the form of increased kinetic energy in the rotor and reversely can reconvert kinetic energy from the rotor into electric power;
the rotor comprises a plurality of diametrically opposite voids that can be filled with adjustment mass components as part of rotor balancing system;
the piston and the piston block have parts that can be replaced;
the piston comprises at least one groove with sealing rings;
the piston comprises an additional edge sealing ring inside the piston chamber;
material in between, the filler material is hardened concrete which has been poured into and hardened in a cylindrical rotor structure.

4. The flywheel according to claim 1, wherein the rotor comprises a series of channels that serve a purpose of mass adjustments for balancing the rotation of the rotor.

5. The flywheel according to claim 1, comprising:
an intermediate part of the rotor that extends radially out from the central vertical shaft, the intermediate part comprises a shoulder on an underside facing downwards; and
a seat inside the housing enclosure for receiving the rotor in a resting mode, with the shoulder of the rotor supported by the seat.

6. The flywheel according to claim 2, wherein the hydraulic axial-radial bearing comprises a hydraulic lift function, a hydraulic fluid expansion tank and a hydraulic pump, for lifting the rotor to an operating mode position or lowering the rotor to a resting mode.

7. The flywheel according to claim 1, wherein the rotor comprises permanent magnets or electromagnetic components.

8. The flywheel according to claim 1, comprising one or more of following features, in any operative combination:
the mass of the rotor is more than 5000 kg and may be preassembled or assembled and completed on site;
the rotor design comprises a load bearing structure made of steel combined with a filler material where a primary
the entire rotor and support system is enclosed in an air tight chamber with a detachable upper lid;

a system that controls an air or gas environment in a sealed chamber in terms of humidity, gas pressure, and gas composition, including the ability to reduce the pressure; and a sealed entrance that allows for access to a flywheel chamber for inspection and repair.

9. A flywheel for energy storage, the flywheel comprising:

a rotor configured to rotate;

a housing enclosure;

an electric motor for charging energy by transferring electric energy to stored kinetic energy in the rotating rotor and an electric generator for discharging energy by transferring stored kinetic energy in the rotating rotor to electric energy;

wherein the rotor is vertically oriented;

wherein the rotor comprises a mass of over 5000 kg;

wherein the rotor comprises a central vertical shaft;

wherein a radial bearing is arranged to an upper end of the central vertical shaft;

wherein an axial-radial bearing, comprising a cylindrical chamber filled with hydraulic fluid into which an end of the central vertical shaft is fitted, is arranged to a lower end of the central vertical shaft;

an intermediate part of the rotor that extends radially out from the central vertical shaft, the intermediate part comprises a shoulder on an underside facing downwards; and a seat inside the housing enclosure for receiving the rotor in a resting mode, with the shoulder of the rotor supported by the seat.

10. A flywheel for energy storage, the flywheel comprising:

a rotor configured to rotate;

a housing enclosure;

an electric motor for charging energy by transferring electric energy to stored kinetic energy in the rotating rotor and an electric generator for discharging energy by transferring stored kinetic energy in the rotating rotor to electric energy;

wherein the rotor is vertically oriented;

wherein the rotor comprises a mass of over 5000 kg;

wherein the rotor comprises a central vertical shaft;

wherein a radial bearing is arranged to an upper end of the central vertical shaft;

wherein an axial-radial bearing, comprising a cylindrical chamber filled with hydraulic fluid into which an end of the central vertical shaft is fitted, is arranged to a lower end of the central vertical shaft; and wherein the axial-radial bearing comprises a hydraulic lift function, a hydraulic fluid expansion tank and a hydraulic pump, for lifting the rotor to an operating mode position or lowering the rotor to a resting mode.

* * * * *

UNITED STATES PATENT AND TRADEMARK OFFICE
CERTIFICATE OF CORRECTION

PATENT NO. : 11,355,997 B2
APPLICATION NO. : 16/969863
DATED : June 7, 2022
INVENTOR(S) : Pål G. Bergan Page 1 of 4

It is certified that error appears in the above-identified patent and that said Letters Patent is hereby corrected as shown below:

In the Claims

Column 23, Lines 34-53
Claim 1

Replace "1. A flywheel for energy storage, the flywheel comprising:
a rotor configured to rotate;
a housing enclosure;
an electric motor for charging energy by transferring electric energy to stored kinetic energy in the rotating rotor and an electric generator for discharging energy by transferring stored kinetic energy in the rotating rotor to electric energy;
wherein the rotor is vertically oriented;
wherein the rotor comprises a mass of over 5000 kg;
wherein the rotor comprises a central vertical shaft;
wherein a radial bearing is arranged to an upper end of the central vertical shaft; and
wherein a radial bearing is arranged to an upper end of the central vertical shaft; and
wherein an axial-radial bearing, comprising a cylindrical chamber filled with hydraulic fluid and an end of the central vertical shaft is fitted into the hydraulic filled chamber, wherein the axial-radial bearing is arranged to a lower end of the central vertical shaft."

With -- 1. A flywheel for energy storage, the flywheel comprising:
a rotor configured to rotate;
a housing enclosure;
an electric motor for charging energy by transferring electric energy to stored kinetic energy in the rotating rotor and an electric generator for discharging energy by transferring stored kinetic energy in the rotating rotor to electric energy;
wherein the rotor is vertically oriented;
wherein the rotor comprises a mass of over 5000 kg;

Signed and Sealed this
Twenty-seventh Day of September, 2022

Katherine Kelly Vidal
*Director of the United States Patent and Trademark Office* wherein the rotor comprises a central vertical shaft;
wherein a radial bearing is arranged to an upper end of the central vertical shaft; and
wherein an axial-radial bearing, comprising a cylindrical chamber filled with hydraulic fluid and an end of the central vertical shaft is fitted into the hydraulic filled chamber, wherein the axial-radial bearing is arranged to a lower end of the central vertical shaft. --

Column 23, Line 56-
Column 24, Line 40
Claim 3

Replace "3. The flywheel according claim 1, wherein:
an intermediate part of the rotor comprises a composite structure;
the composite structure comprises coaxial shell cylinders and steel radial armoring, the coaxial shell cylinders and armoring made of steel and filler load bearing material is arranged with axisymmetric and multilayer panels providing completed cylindrical enclosures, planar vertical radial panels and horizontal panels, interconnected by welding or other connection methods, and the filler material fills voids of the load bearing structure;
the central vertical shaft comprising a cylindrical metal shaft located in a central position thereof and provide a connection with a lower and an upper support system;
a lower part of the cylindrical metal shaft is shaped as a piston that closely fits within a piston chamber of the lower support system;
a hydraulic load bearing and lubricating fluid in the piston chamber onto which the piston rests with a weight of the rotor during rotation;
a pressurized hydraulic system in which pressure is consistent with the weight of the rotor, leaked hydraulic fluid is recirculated and where the pressure is maintained by way of a pressure pump system;
the rotor can be lowered into a resting position by reducing an amount of fluid in the hydraulic piston chamber and transferring it into an expansion tank, thereby facilitate removal and replacement of parts that are subjected to wear in the lower and upper supports;
parametric geometric relations between the piston, piston block, middle block and base block is such that such replacements may be done;
one or several electromagnetic motor-generators that by way of external electric power source converts electricity to mechanical power that is stored in the form of increased kinetic energy in the rotor and reversely can reconvert kinetic energy from the rotor into electric power;
the rotor comprises a plurality of diametrically opposite voids that can be filled with adjustment mass components as part of rotor balancing system;
the piston and the piston block have parts that can be replaced;
the piston comprises at least one groove with sealing rings;
the piston comprises an additional edge sealing ring inside the piston chamber;
material in between, the filler material is hardened concrete which has been poured into and hardened in a cylindrical rotor structure."

With -- 3. The flywheel according claim 1, wherein:
an intermediate part of the rotor comprises a composite structure;
the composite structure comprises coaxial shell cylinders and steel radial armoring, the coaxial shell cylinders and armoring made of steel and filler material in between, the filler material is hardened concrete which has been poured into and hardened in a cylindrical rotor structure. --

Column 24, Line 60-
Column 25, Line 6
Claim 8

Replace "8. The flywheel according to claim 1, comprising one or more of following features, in any operative combination:
the mass of the rotor is more than 5000 kg and may be preassembled or assembled and completed on site;
the rotor design comprises a load bearing structure made of steel combined with a filler material where a primary the entire rotor and support system is enclosed in an air tight chamber with a detachable upper lid;
a system that controls an air or gas environment in a sealed chamber in terms of humidity, gas pressure, and gas composition, including the ability to reduce the pressure; and
a sealed entrance that allows for access to a flywheel chamber for inspection and repair."

With -- 8. The flywheel according to claim 1, comprising one or more of following features, in any operative combination:
the mass of the rotor is more than 5000 kg and may be preassembled or assembled and completed on site;
the rotor design comprises a load bearing structure made of steel combined with a filler material where a primary load bearing material is arranged with axisymmetric and multilayer panels providing completed cylindrical enclosures, planar vertical radial panels and horizontal panels,
interconnected by welding or other connection methods, and the filler material fills voids of the load bearing structure;
the central vertical shaft comprising a cylindrical metal shaft located in a central position thereof and provides a connection with a lower and an upper support system;
a lower part of the cylindrical metal shaft is shaped as a piston that fits within a piston chamber of the lower support system;
a hydraulic load bearing and lubricating fluid in the piston chamber onto which the piston rests with a weight of the rotor during rotation;
a pressurized hydraulic system in which pressure is consistent with the weight of the rotor, leaked hydraulic fluid is recirculated and where the pressure is maintained by way of a pressure pump system; the rotor can be lowered into a resting position by reducing an amount of fluid in the hydraulic piston chamber and transferring it into an expansion tank, thereby facilitate removal and replacement of parts that are subjected to wear in the lower and upper supports; parametric geometric relations between the piston, piston block, middle block and base block is such that such replacements may be done;

one or several electromagnetic motor-generators that by way of external electric power source converts electricity to mechanical power that is stored in the form of increased kinetic energy in the rotor and reversely can reconvert kinetic energy from the rotor into electric power;

the rotor comprises a plurality of diametrically opposite voids that can be filled with adjustment mass components as part of rotor balancing system;

the piston and the piston block have parts that can be replaced;

the piston comprises at least one groove with sealing rings;

the piston comprises an additional edge sealing ring inside the piston chamber;

the entire rotor and support system is enclosed in an air tight chamber with a detachable upper lid;

a system that controls an air or gas environment in a sealed chamber in terms of humidity, gas pressure, and gas composition, including the ability to reduce the pressure; and a sealed entrance that allows for access to a flywheel chamber for inspection and repair. --